US009008075B2

(12) United States Patent
Anisimov et al.

(10) Patent No.: US 9,008,075 B2
(45) Date of Patent: Apr. 14, 2015

(54) SYSTEM AND METHODS FOR IMPROVING INTERACTION ROUTING PERFORMANCE

(75) Inventors: Nikolay Anisimov, Concord, CA (US); Vyacheslav Sayko, Walnut Creek, CA (US); Vitaliy Teryoshin, Danville, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 924 days.

(21) Appl. No.: 12/340,937

(22) Filed: Dec. 22, 2008

(65) Prior Publication Data

US 2010/0157979 A1    Jun. 24, 2010

(51) Int. Cl.
*H04L 12/66* (2006.01)
*H04L 12/28* (2006.01)
*H04L 29/06* (2006.01)

(52) U.S. Cl.
CPC ........ *H04L 65/1043* (2013.01); *H04L 65/1096* (2013.01)

(58) Field of Classification Search
USPC .................................................. 370/352–356
See application file for complete search history.

(56) References Cited

U.S. PATENT DOCUMENTS

| | | |
|---|---|---|
| 3,914,559 A | 10/1975 | Knollman |
| 4,048,452 A | 9/1977 | Oehring et al. |
| 4,290,141 A | 9/1981 | Anderson et al. |
| 4,320,256 A | 3/1982 | Freeman |
| 4,345,315 A | 8/1982 | Cadotte et al. |
| 4,355,207 A | 10/1982 | Curtin |
| 4,355,372 A | 10/1982 | Johnson et al. |
| 4,400,587 A | 8/1983 | Taylor et al. |
| 4,439,636 A | 3/1984 | Newkirk et al. |
| 4,451,700 A | 5/1984 | Kempner et al. |
| 4,489,438 A | 12/1984 | Hughes |
| 4,512,011 A | 4/1985 | Turner |

(Continued)

FOREIGN PATENT DOCUMENTS

| | | |
|---|---|---|
| AT | 270486 | 7/2004 |
| AT | 281039 | 11/2004 |

(Continued)

OTHER PUBLICATIONS

International Search Report and Written Opinion of the International Searching Authority, dated Mar. 31, 2010, for International application No. PCT/US2009/068402, 10 pages.

(Continued)

*Primary Examiner* — Brandon Renner
(74) *Attorney, Agent, or Firm* — Christie, Parker & Hale, LLP

(57) ABSTRACT

An interaction router includes a computerized server executing a routing engine stored on a machine-readable medium, an interface at the server receiving information from an interaction switching element, the information regarding an interaction received at the switching element to be routed, an interface at the server to a wide area network (WAN), a function of the routing engine judging if one or more business-logic determinations are to be made to select a routing destination for the interaction, and a function for controlling the switch to route the interaction. If if one or more business-logic determinations are to be made, the routing engine requests the business-logic determination from a remote server over the WAN, and upon receiving the determination from the remote server, uses the determination in controlling the switching element to route the interaction.

18 Claims, 3 Drawing Sheets

(56) References Cited

U.S. PATENT DOCUMENTS

| | | |
|---|---|---|
| 4,517,410 A | 5/1985 | Williams et al. |
| 4,521,643 A | 6/1985 | Dupuis et al. |
| 4,523,055 A | 6/1985 | Hohl et al. |
| 4,528,643 A | 7/1985 | Freeny, Jr. |
| 4,539,435 A | 9/1985 | Eckmann |
| 4,555,903 A | 12/1985 | Heaton |
| 4,558,180 A | 12/1985 | Scordo |
| 4,559,415 A | 12/1985 | Bernard et al. |
| 4,566,030 A | 1/1986 | Nickerson et al. |
| 4,567,323 A | 1/1986 | Lottes et al. |
| 4,577,062 A | 3/1986 | Hilleary et al. |
| 4,577,067 A | 3/1986 | Levy et al. |
| 4,578,700 A | 3/1986 | Roberts et al. |
| 4,580,012 A | 4/1986 | Matthews et al. |
| 4,584,602 A | 4/1986 | Nakagawa |
| 4,587,379 A | 5/1986 | Masuda |
| 4,598,367 A | 7/1986 | DeFrancesco et al. |
| 4,603,232 A | 7/1986 | Kurland et al. |
| 4,611,094 A | 9/1986 | Asmuth et al. |
| 4,625,276 A | 11/1986 | Benton et al. |
| 4,630,200 A | 12/1986 | Ohmae et al. |
| 4,630,201 A | 12/1986 | White |
| 4,634,809 A | 1/1987 | Paulsson et al. |
| 4,649,563 A | 3/1987 | Riskin |
| 4,654,482 A | 3/1987 | DeAngelis |
| 4,667,287 A | 5/1987 | Allen et al. |
| 4,674,044 A | 6/1987 | Kalmus et al. |
| 4,679,189 A | 7/1987 | Olson et al. |
| 4,696,029 A | 9/1987 | Cohen |
| 4,697,282 A | 9/1987 | Winter et al. |
| 4,737,983 A | 4/1988 | Frauenthal et al. |
| 4,756,020 A | 7/1988 | Fodale |
| 4,757,267 A | 7/1988 | Riskin |
| 4,763,191 A | 8/1988 | Gordon et al. |
| 4,763,317 A | 8/1988 | Lehman et al. |
| 4,763,353 A | 8/1988 | Canale et al. |
| 4,771,425 A | 9/1988 | Baran et al. |
| 4,785,408 A | 11/1988 | Britton et al. |
| 4,788,715 A | 11/1988 | Lee |
| 4,811,382 A | 3/1989 | Sleevi |
| 4,812,843 A | 3/1989 | Champion, III et al. |
| 4,829,563 A | 5/1989 | Crockett et al. |
| 4,831,518 A | 5/1989 | Yu et al. |
| 4,852,001 A | 7/1989 | Tsushima et al. |
| 4,866,756 A | 9/1989 | Crane et al. |
| 4,881,261 A | 11/1989 | Oliphant et al. |
| 4,893,328 A | 1/1990 | Peacock |
| 4,896,345 A | 1/1990 | Thorne |
| 4,897,866 A | 1/1990 | Majmudar et al. |
| 4,908,850 A | 3/1990 | Masson et al. |
| 4,924,488 A | 5/1990 | Kosich |
| 4,943,995 A | 7/1990 | Daudelin et al. |
| 4,953,204 A | 8/1990 | Cuschleg, Jr. et al. |
| 4,972,461 A | 11/1990 | Brown et al. |
| 4,994,985 A | 2/1991 | Cree et al. |
| 5,001,710 A | 3/1991 | Gawrys et al. |
| 5,008,930 A | 4/1991 | Gawrys et al. |
| 5,017,917 A | 5/1991 | Fisher et al. |
| 5,020,095 A | 5/1991 | Morganstein et al. |
| 5,036,535 A | 7/1991 | Gechter et al. |
| 5,058,152 A | 10/1991 | Solomon et al. |
| 5,062,103 A | 10/1991 | Davidson et al. |
| 5,073,890 A | 12/1991 | Danielsen |
| 5,095,504 A | 3/1992 | Nishikawa et al. |
| 5,117,225 A | 5/1992 | Wang |
| 5,136,633 A | 8/1992 | Tejada et al. |
| 5,155,761 A | 10/1992 | Hammond |
| 5,164,983 A | 11/1992 | Brown et al. |
| 5,168,515 A | 12/1992 | Gechter et al. |
| 5,175,800 A | 12/1992 | Galis et al. |
| 5,179,589 A | 1/1993 | Syu |
| 5,181,236 A | 1/1993 | LaVallee et al. |
| 5,181,239 A | 1/1993 | Jolissaint |
| 5,185,782 A | 2/1993 | Srinivasan |
| 5,202,828 A | 4/1993 | Vertelney et al. |
| 5,206,903 A | 4/1993 | Kohler et al. |
| 5,208,745 A | 5/1993 | Quentin et al. |
| 5,212,727 A | 5/1993 | Ramkumar |
| 5,214,688 A | 5/1993 | Szlam et al. |
| 5,231,670 A | 7/1993 | Goldhor et al. |
| 5,247,569 A | 9/1993 | Cave |
| 5,249,223 A | 9/1993 | Vanacore |
| 5,253,288 A | 10/1993 | Frey et al. |
| 5,256,863 A | 10/1993 | Ferguson et al. |
| 5,261,096 A | 11/1993 | Howarth |
| 5,271,058 A | 12/1993 | Andrews et al. |
| 5,274,635 A | 12/1993 | Rahman et al. |
| 5,274,700 A | 12/1993 | Gechter et al. |
| 5,274,782 A | 12/1993 | Chalasani et al. |
| 5,278,898 A | 1/1994 | Cambray et al. |
| 5,278,977 A | 1/1994 | Spencer et al. |
| 5,280,625 A | 1/1994 | Howarter et al. |
| 5,283,638 A | 2/1994 | Engberg et al. |
| 5,283,856 A | 2/1994 | Gross et al. |
| 5,285,494 A | 2/1994 | Sprecher et al. |
| 5,288,147 A | 2/1994 | Schaefer et al. |
| 5,291,550 A | 3/1994 | Levy et al. |
| 5,291,551 A | 3/1994 | Conn et al. |
| 5,291,552 A | 3/1994 | Kerrigan et al. |
| 5,299,259 A | 3/1994 | Otto |
| 5,299,260 A | 3/1994 | Shaio |
| 5,301,320 A | 4/1994 | McAtee et al. |
| 5,309,505 A | 5/1994 | Szlam et al. |
| 5,311,574 A | 5/1994 | Livanos |
| 5,311,583 A | 5/1994 | Friedes et al. |
| 5,315,709 A | 5/1994 | Alston, Jr. et al. |
| 5,327,486 A | 7/1994 | Wolff et al. |
| 5,329,583 A | 7/1994 | Jurgensen et al. |
| 5,333,266 A | 7/1994 | Boaz et al. |
| 5,335,268 A | 8/1994 | Kelly, Jr. et al. |
| 5,335,269 A | 8/1994 | Steinlicht |
| 5,343,477 A | 8/1994 | Yamada |
| 5,343,518 A | 8/1994 | Kneipp |
| 5,355,474 A | 10/1994 | Thuraisngham et al. |
| 5,359,649 A | 10/1994 | Rosu et al. |
| 5,363,507 A | 11/1994 | Nakayama et al. |
| 5,367,329 A | 11/1994 | Nakagaki et al. |
| 5,369,695 A | 11/1994 | Chakravarti et al. |
| 5,384,766 A | 1/1995 | Yamato et al. |
| 5,384,771 A | 1/1995 | Isidoro et al. |
| 5,384,829 A | 1/1995 | Heileman, Jr. et al. |
| 5,384,841 A | 1/1995 | Adams et al. |
| 5,392,277 A | 2/1995 | Bernstein |
| 5,392,328 A | 2/1995 | Schmidt et al. |
| 5,392,345 A | 2/1995 | Otto |
| 5,392,400 A | 2/1995 | Berkowitz et al. |
| 5,402,474 A | 3/1995 | Miller et al. |
| 5,414,762 A | 5/1995 | Flisik et al. |
| 5,422,813 A | 6/1995 | Schuchman et al. |
| 5,425,091 A | 6/1995 | Josephs |
| 5,425,093 A | 6/1995 | Trefzger |
| 5,426,594 A | 6/1995 | Wright et al. |
| 5,428,608 A | 6/1995 | Freeman et al. |
| 5,436,965 A | 7/1995 | Grossman et al. |
| 5,436,967 A | 7/1995 | Hanson |
| 5,440,719 A | 8/1995 | Hanes et al. |
| 5,444,767 A | 8/1995 | Goetcheus et al. |
| 5,444,774 A | 8/1995 | Friedes |
| 5,444,823 A | 8/1995 | Nguyen |
| 5,450,482 A | 9/1995 | Chen et al. |
| 5,450,483 A | 9/1995 | Williams |
| 5,452,350 A | 9/1995 | Reynolds et al. |
| 5,455,903 A | 10/1995 | Jolissaint et al. |
| 5,459,780 A | 10/1995 | Sand |
| 5,463,685 A | 10/1995 | Gaechter et al. |
| 5,465,286 A | 11/1995 | Clare et al. |
| 5,467,391 A | 11/1995 | Donaghue, Jr. et al. |
| 5,469,504 A | 11/1995 | Blaha |
| 5,473,680 A | 12/1995 | Porter |
| 5,475,813 A | 12/1995 | Cieslak et al. |
| 5,479,487 A | 12/1995 | Hammond |
| 5,481,616 A | 1/1996 | Freadman |
| 5,488,648 A | 1/1996 | Womble |
| 5,491,783 A | 2/1996 | Douglas et al. |

(56) References Cited

U.S. PATENT DOCUMENTS

| | | |
|---|---|---|
| 5,493,564 A | 2/1996 | Mullan |
| 5,495,522 A | 2/1996 | Allen et al. |
| 5,495,523 A | 2/1996 | Stent et al. |
| 5,496,392 A | 3/1996 | Sims et al. |
| 5,497,317 A | 3/1996 | Hawkins et al. |
| 5,497,371 A | 3/1996 | Ellis et al. |
| 5,497,373 A | 3/1996 | Hulen et al. |
| 5,500,891 A | 3/1996 | Harrington et al. |
| 5,506,898 A | 4/1996 | Costantini et al. |
| 5,509,062 A | 4/1996 | Carlsen |
| 5,510,829 A | 4/1996 | Sugiyama et al. |
| 5,511,117 A | 4/1996 | Zazzera |
| 5,517,620 A | 5/1996 | Hashimoto et al. |
| 5,519,773 A | 5/1996 | Dumas et al. |
| 5,524,047 A | 6/1996 | Brown et al. |
| 5,524,147 A | 6/1996 | Bean |
| 5,526,353 A | 6/1996 | Henley et al. |
| 5,528,678 A | 6/1996 | Kaplan |
| 5,530,740 A | 6/1996 | Irribarren et al. |
| 5,530,744 A | 6/1996 | Charalambous et al. |
| 5,533,103 A | 7/1996 | Peavey et al. |
| 5,533,107 A | 7/1996 | Irwin et al. |
| 5,533,108 A | 7/1996 | Harris et al. |
| 5,533,110 A | 7/1996 | Pinard et al. |
| 5,533,115 A | 7/1996 | Hollenbach et al. |
| 5,535,211 A | 7/1996 | Yano |
| 5,535,256 A | 7/1996 | Maloney et al. |
| 5,535,323 A | 7/1996 | Miller et al. |
| 5,537,470 A | 7/1996 | Lee |
| 5,537,630 A | 7/1996 | Berry et al. |
| 5,539,811 A | 7/1996 | Nakamura et al. |
| 5,544,220 A | 8/1996 | Trefzger |
| 5,546,452 A | 8/1996 | Andrews et al. |
| 5,550,816 A | 8/1996 | Hardwick et al. |
| 5,553,133 A | 9/1996 | Perkins |
| 5,555,299 A | 9/1996 | Maloney et al. |
| 5,555,426 A | 9/1996 | Johnson et al. |
| 5,557,667 A | 9/1996 | Bruno et al. |
| 5,559,868 A | 9/1996 | Blonder |
| 5,559,877 A | 9/1996 | Ash et al. |
| 5,559,878 A | 9/1996 | Keys et al. |
| 5,561,711 A | 10/1996 | Muller |
| 5,561,841 A | 10/1996 | Markus |
| 5,563,805 A | 10/1996 | Arbuckle et al. |
| 5,563,937 A | 10/1996 | Bruno et al. |
| 5,566,294 A | 10/1996 | Kojima et al. |
| 5,570,419 A | 10/1996 | Cave et al. |
| 5,570,420 A | 10/1996 | Bress et al. |
| 5,572,579 A | 11/1996 | Orriss et al. |
| 5,572,643 A | 11/1996 | Judson |
| 5,577,100 A | 11/1996 | McGregor et al. |
| 5,577,105 A | 11/1996 | Baum et al. |
| 5,583,862 A | 12/1996 | Callon |
| 5,583,922 A | 12/1996 | Davis et al. |
| 5,590,188 A | 12/1996 | Crockett |
| 5,592,542 A | 1/1997 | Honda et al. |
| 5,592,543 A | 1/1997 | Smith et al. |
| 5,594,791 A | 1/1997 | Szlam et al. |
| 5,598,532 A | 1/1997 | Liron |
| 5,604,737 A | 2/1997 | Iwami et al. |
| 5,606,602 A | 2/1997 | Johnson et al. |
| 5,608,778 A | 3/1997 | Partridge, III |
| 5,608,786 A | 3/1997 | Gordon |
| 5,610,910 A | 3/1997 | Focsaneanu et al. |
| 5,617,570 A | 4/1997 | Russell et al. |
| 5,619,183 A | 4/1997 | Ziegra et al. |
| 5,619,557 A | 4/1997 | Van Berkum |
| 5,619,648 A | 4/1997 | Canale et al. |
| 5,621,789 A | 4/1997 | McCalmont et al. |
| 5,621,790 A | 4/1997 | Grossman et al. |
| 5,623,600 A | 4/1997 | Ji et al. |
| 5,624,265 A | 4/1997 | Redford et al. |
| 5,625,404 A | 4/1997 | Grady et al. |
| 5,625,676 A | 4/1997 | Greco et al. |
| 5,625,682 A | 4/1997 | Gray et al. |
| 5,627,764 A | 5/1997 | Schutzman et al. |
| 5,627,884 A | 5/1997 | Williams et al. |
| 5,630,127 A | 5/1997 | Moore et al. |
| 5,632,011 A | 5/1997 | Landfield et al. |
| 5,633,920 A | 5/1997 | Kikinis et al. |
| 5,633,924 A | 5/1997 | Kaish et al. |
| 5,635,918 A | 6/1997 | Tett |
| 5,640,445 A | 6/1997 | David |
| 5,642,411 A | 6/1997 | Theis |
| 5,642,477 A | 6/1997 | de Carmo et al. |
| 5,642,511 A | 6/1997 | Chow et al. |
| 5,644,720 A | 7/1997 | Boll et al. |
| 5,646,981 A | 7/1997 | Klein |
| 5,649,105 A | 7/1997 | Aldred et al. |
| 5,652,789 A | 7/1997 | Miner et al. |
| 5,652,791 A | 7/1997 | Sunderman et al. |
| 5,654,961 A | 8/1997 | Araujo et al. |
| 5,655,015 A | 8/1997 | Walsh et al. |
| 5,657,383 A | 8/1997 | Gerber et al. |
| 5,659,542 A | 8/1997 | Bell et al. |
| 5,659,604 A | 8/1997 | Beckmann |
| 5,659,746 A | 8/1997 | Bankert et al. |
| 5,673,304 A | 9/1997 | Connor et al. |
| 5,673,311 A | 9/1997 | Andruska et al. |
| 5,673,322 A | 9/1997 | Pepe et al. |
| 5,675,637 A | 10/1997 | Szlam et al. |
| 5,684,870 A | 11/1997 | Maloney et al. |
| 5,689,229 A | 11/1997 | Chaco et al. |
| 5,692,033 A | 11/1997 | Farris |
| 5,696,809 A | 12/1997 | Voit |
| 5,696,811 A | 12/1997 | Maloney et al. |
| 5,701,400 A | 12/1997 | Amado |
| 5,703,943 A | 12/1997 | Otto |
| 5,706,453 A | 1/1998 | Cheng et al. |
| 5,708,702 A | 1/1998 | De Paul et al. |
| 5,712,901 A | 1/1998 | Meermans |
| 5,715,306 A | 2/1998 | Sunderman et al. |
| 5,715,307 A | 2/1998 | Zazzera |
| 5,715,432 A | 2/1998 | Xu et al. |
| 5,717,747 A | 2/1998 | Boyle, III et al. |
| 5,721,770 A | 2/1998 | Kohler |
| 5,724,412 A | 3/1998 | Srinivasan |
| 5,724,418 A | 3/1998 | Brady |
| 5,726,984 A | 3/1998 | Kubler et al. |
| 5,727,159 A | 3/1998 | Kikinis |
| 5,729,594 A | 3/1998 | Klingman |
| 5,732,078 A | 3/1998 | Arango |
| 5,734,981 A | 3/1998 | Kennedy, III et al. |
| 5,737,495 A | 4/1998 | Adams et al. |
| 5,737,595 A | 4/1998 | Cohen et al. |
| 5,737,726 A | 4/1998 | Cameron et al. |
| 5,737,727 A | 4/1998 | Lehmann et al. |
| 5,740,238 A | 4/1998 | Flockhart et al. |
| 5,740,240 A | 4/1998 | Jolissaint |
| 5,742,668 A | 4/1998 | Pepe et al. |
| 5,742,670 A | 4/1998 | Bennett |
| 5,742,675 A | 4/1998 | Kilander et al. |
| 5,742,905 A | 4/1998 | Pepe et al. |
| 5,745,687 A | 4/1998 | Randell |
| 5,745,878 A | 4/1998 | Hashimoto et al. |
| 5,748,884 A | 5/1998 | Royce et al. |
| 5,748,907 A | 5/1998 | Crane |
| 5,751,706 A | 5/1998 | Land et al. |
| 5,751,707 A | 5/1998 | Voit et al. |
| 5,751,795 A | 5/1998 | Hassler et al. |
| 5,752,059 A | 5/1998 | Holleran et al. |
| 5,752,244 A | 5/1998 | Rose et al. |
| 5,752,246 A | 5/1998 | Rogers et al. |
| 5,754,111 A | 5/1998 | Garcia |
| 5,754,636 A | 5/1998 | Bayless et al. |
| 5,754,639 A | 5/1998 | Flockhart et al. |
| 5,754,655 A | 5/1998 | Hughes et al. |
| 5,757,904 A | 5/1998 | Anderson |
| 5,760,823 A | 6/1998 | Brunson et al. |
| 5,761,289 A | 6/1998 | Keshav |
| 5,764,736 A | 6/1998 | Shachar et al. |
| 5,764,898 A | 6/1998 | Tsuji et al. |
| 5,765,033 A | 6/1998 | Miloslavsky |
| 5,768,360 A | 6/1998 | Reynolds et al. |

(56) References Cited

U.S. PATENT DOCUMENTS

| | | |
|---|---|---|
| 5,768,527 A | 6/1998 | Zhu et al. |
| 5,774,583 A | 6/1998 | Sasaki et al. |
| 5,778,060 A | 7/1998 | Otto |
| 5,778,178 A | 7/1998 | Arunachalam |
| 5,778,377 A | 7/1998 | Marlin et al. |
| 5,784,438 A | 7/1998 | Martinez |
| 5,784,451 A | 7/1998 | Smith, Jr. |
| 5,784,452 A | 7/1998 | Carney |
| 5,787,160 A | 7/1998 | Chaney et al. |
| 5,787,163 A | 7/1998 | Taylor et al. |
| 5,790,635 A | 8/1998 | Dezonno |
| 5,790,650 A | 8/1998 | Dunn et al. |
| 5,790,789 A | 8/1998 | Suarez |
| 5,790,798 A | 8/1998 | Beckett, II et al. |
| 5,793,857 A | 8/1998 | Barnes et al. |
| 5,793,861 A | 8/1998 | Haigh |
| 5,794,039 A | 8/1998 | Guck |
| 5,796,398 A | 8/1998 | Zimmer |
| 5,796,729 A | 8/1998 | Greaney et al. |
| 5,796,791 A | 8/1998 | Polcyn |
| 5,796,813 A | 8/1998 | Sonnenberg |
| 5,799,067 A | 8/1998 | Kikinis et al. |
| 5,799,297 A | 8/1998 | Goodridge et al. |
| 5,802,163 A | 9/1998 | Miloslavsky |
| 5,802,253 A | 9/1998 | Gross et al. |
| 5,802,283 A | 9/1998 | Grady et al. |
| 5,802,314 A | 9/1998 | Tullis et al. |
| 5,802,316 A | 9/1998 | Ito et al. |
| 5,802,493 A | 9/1998 | Sheflott et al. |
| 5,802,526 A | 9/1998 | Fawcett et al. |
| 5,805,587 A | 9/1998 | Norris et al. |
| 5,806,061 A | 9/1998 | Chaudhuri et al. |
| 5,809,128 A | 9/1998 | McMullin |
| 5,809,282 A | 9/1998 | Cooper et al. |
| 5,809,512 A | 9/1998 | Kato |
| 5,812,795 A | 9/1998 | Horovitz et al. |
| 5,813,014 A | 9/1998 | Gustman |
| 5,815,566 A | 9/1998 | Ramot et al. |
| 5,818,935 A | 10/1998 | Maa |
| 5,822,306 A | 10/1998 | Catchpole |
| 5,822,400 A | 10/1998 | Smith |
| 5,822,404 A | 10/1998 | Cave |
| 5,822,526 A | 10/1998 | Waskiewicz |
| 5,825,775 A | 10/1998 | Chin et al. |
| 5,825,862 A | 10/1998 | Voit et al. |
| 5,825,869 A | 10/1998 | Brooks et al. |
| 5,825,870 A | 10/1998 | Miloslavsky |
| 5,826,040 A | 10/1998 | Fargher et al. |
| 5,826,269 A | 10/1998 | Hussey |
| 5,828,747 A | 10/1998 | Fisher et al. |
| 5,828,839 A | 10/1998 | Moncreiff |
| 5,831,611 A | 11/1998 | Kennedy et al. |
| 5,832,196 A | 11/1998 | Croslin et al. |
| 5,835,090 A | 11/1998 | Clark et al. |
| 5,835,583 A | 11/1998 | Hetz et al. |
| 5,838,682 A | 11/1998 | Dekelbaum et al. |
| 5,838,768 A | 11/1998 | Sumar et al. |
| 5,838,774 A | 11/1998 | Weisser, Jr. |
| 5,841,854 A | 11/1998 | Schumacher et al. |
| 5,842,131 A | 11/1998 | Yamane |
| 5,844,980 A | 12/1998 | Patel et al. |
| 5,844,982 A | 12/1998 | Knitl |
| 5,847,484 A | 12/1998 | Kuyama et al. |
| 5,848,131 A | 12/1998 | Shaffer et al. |
| 5,848,143 A | 12/1998 | Andrews et al. |
| 5,850,433 A | 12/1998 | Rondeau |
| 5,852,814 A | 12/1998 | Allen |
| 5,857,184 A | 1/1999 | Lynch |
| 5,862,134 A | 1/1999 | Deng |
| 5,862,211 A | 1/1999 | Roush |
| 5,862,223 A | 1/1999 | Walker et al. |
| 5,864,616 A | 1/1999 | Hartmeier |
| 5,864,848 A | 1/1999 | Horvitz et al. |
| 5,867,484 A | 2/1999 | Shaunfield |
| 5,867,494 A | 2/1999 | Krishnaswamy et al. |
| 5,867,495 A | 2/1999 | Elliott et al. |
| 5,867,559 A | 2/1999 | Jorgensen et al. |
| 5,867,562 A | 2/1999 | Scherer |
| 5,867,822 A | 2/1999 | Sankar |
| 5,870,464 A | 2/1999 | Brewster et al. |
| 5,870,549 A | 2/1999 | Bobo, II |
| 5,872,841 A | 2/1999 | King et al. |
| 5,872,926 A | 2/1999 | Levac et al. |
| 5,873,032 A | 2/1999 | Cox et al. |
| 5,873,040 A | 2/1999 | Dunn et al. |
| 5,873,076 A | 2/1999 | Barr et al. |
| 5,878,126 A | 3/1999 | Velamuri et al. |
| 5,878,130 A | 3/1999 | Andrews et al. |
| 5,878,230 A | 3/1999 | Weber et al. |
| 5,881,146 A | 3/1999 | Hamilton |
| 5,883,891 A | 3/1999 | Williams et al. |
| 5,884,032 A | 3/1999 | Bateman et al. |
| 5,884,262 A | 3/1999 | Wise et al. |
| 5,887,173 A | 3/1999 | Ogawa et al. |
| 5,889,474 A | 3/1999 | LaDue |
| 5,889,774 A | 3/1999 | Mirashrafi et al. |
| 5,889,799 A | 3/1999 | Grossman et al. |
| 5,889,863 A | 3/1999 | Weber |
| 5,892,764 A | 4/1999 | Riemann et al. |
| 5,892,822 A | 4/1999 | Gottlieb et al. |
| 5,893,912 A | 4/1999 | Freund et al. |
| 5,894,512 A | 4/1999 | Zenner |
| 5,896,444 A | 4/1999 | Perlman et al. |
| 5,897,635 A | 4/1999 | Torres et al. |
| 5,901,138 A | 5/1999 | Bader et al. |
| 5,901,203 A | 5/1999 | Morganstein et al. |
| 5,901,209 A | 5/1999 | Tannenbaum et al. |
| 5,903,631 A | 5/1999 | Smith et al. |
| 5,903,877 A | 5/1999 | Berkowitz et al. |
| 5,905,495 A | 5/1999 | Tanaka et al. |
| 5,905,792 A | 5/1999 | Miloslavsky |
| 5,905,793 A | 5/1999 | Flockhart et al. |
| 5,905,863 A | 5/1999 | Knowles et al. |
| 5,907,547 A | 5/1999 | Foladare et al. |
| 5,911,134 A | 6/1999 | Castonguay et al. |
| 5,911,776 A | 6/1999 | Guck |
| 5,914,941 A | 6/1999 | Janky |
| 5,915,001 A | 6/1999 | Uppaluru |
| 5,915,008 A | 6/1999 | Dulman |
| 5,915,011 A | 6/1999 | Miloslavsky |
| 5,915,012 A | 6/1999 | Miloslavsky |
| 5,916,302 A | 6/1999 | Dunn et al. |
| 5,917,817 A | 6/1999 | Dunn et al. |
| 5,917,898 A | 6/1999 | Bassa et al. |
| 5,918,213 A | 6/1999 | Bernard et al. |
| 5,920,621 A | 7/1999 | Gottlieb |
| 5,920,719 A | 7/1999 | Sutton et al. |
| 5,920,865 A | 7/1999 | Ariga |
| 5,923,745 A | 7/1999 | Hurd |
| 5,923,879 A | 7/1999 | Sasmazel et al. |
| 5,926,535 A | 7/1999 | Reynolds |
| 5,926,538 A | 7/1999 | Deryugin et al. |
| 5,926,539 A | 7/1999 | Shtivelman |
| 5,933,492 A | 8/1999 | Turovski |
| 5,937,051 A | 8/1999 | Hurd et al. |
| 5,937,057 A | 8/1999 | Bell et al. |
| 5,937,162 A | 8/1999 | Funk et al. |
| 5,937,388 A | 8/1999 | Davis et al. |
| 5,938,725 A | 8/1999 | Hara |
| 5,940,075 A | 8/1999 | Mutschler, III et al. |
| 5,940,478 A | 8/1999 | Vaudreuil et al. |
| 5,940,479 A | 8/1999 | Guy et al. |
| 5,940,488 A | 8/1999 | DeGrazia et al. |
| 5,940,495 A | 8/1999 | Bondarenko et al. |
| 5,940,496 A | 8/1999 | Gisby et al. |
| 5,940,497 A | 8/1999 | Miloslavsky |
| 5,940,598 A | 8/1999 | Strauss et al. |
| 5,940,823 A | 8/1999 | Schreiber et al. |
| 5,943,416 A | 8/1999 | Gisby |
| 5,946,375 A | 8/1999 | Pattison et al. |
| 5,946,386 A | 8/1999 | Rogers et al. |
| 5,946,387 A | 8/1999 | Miloslavsky |
| 5,948,054 A | 9/1999 | Nielsen |
| 5,949,988 A | 9/1999 | Feisullin et al. |

(56) References Cited

U.S. PATENT DOCUMENTS

| | | |
|---|---|---|
| 5,953,332 A | 9/1999 | Miloslavsky |
| 5,953,405 A | 9/1999 | Miloslavsky |
| 5,953,406 A | 9/1999 | LaRue et al. |
| 5,956,482 A | 9/1999 | Agraharam et al. |
| 5,956,729 A | 9/1999 | Goetz et al. |
| 5,958,014 A | 9/1999 | Cave |
| 5,958,016 A | 9/1999 | Chang et al. |
| 5,958,064 A | 9/1999 | Judd et al. |
| 5,959,982 A | 9/1999 | Federkins et al. |
| 5,960,073 A | 9/1999 | Kikinis et al. |
| 5,960,411 A | 9/1999 | Hartman et al. |
| 5,963,632 A | 10/1999 | Miloslavsky |
| 5,963,635 A | 10/1999 | Szlam et al. |
| 5,966,427 A | 10/1999 | Shaffer et al. |
| 5,966,695 A | 10/1999 | Melchione et al. |
| 5,970,065 A | 10/1999 | Miloslavsky |
| 5,970,134 A | 10/1999 | Highland et al. |
| 5,974,135 A | 10/1999 | Breneman et al. |
| 5,974,414 A | 10/1999 | Stanczak et al. |
| 5,974,448 A | 10/1999 | Yamauchi et al. |
| RE36,416 E | 11/1999 | Szlam et al. |
| 5,978,465 A | 11/1999 | Corduroy et al. |
| 5,978,467 A | 11/1999 | Walker et al. |
| 5,978,672 A | 11/1999 | Hartmaier et al. |
| 5,978,836 A | 11/1999 | Ouchi |
| 5,982,774 A | 11/1999 | Foladare et al. |
| 5,982,870 A | 11/1999 | Pershan et al. |
| 5,982,873 A | 11/1999 | Flockhart et al. |
| 5,983,218 A | 11/1999 | Syeda-Mahmood |
| 5,987,102 A | 11/1999 | Elliott et al. |
| 5,987,117 A | 11/1999 | McNeil et al. |
| 5,987,118 A | 11/1999 | Dickerman et al. |
| 5,987,423 A | 11/1999 | Arnold et al. |
| 5,987,446 A | 11/1999 | Corey et al. |
| 5,991,365 A | 11/1999 | Pizano et al. |
| 5,991,390 A | 11/1999 | Booton |
| 5,991,391 A | 11/1999 | Miloslavsky |
| 5,991,392 A | 11/1999 | Miloslavsky |
| 5,991,393 A | 11/1999 | Kamen |
| 5,991,394 A | 11/1999 | Dezonno et al. |
| 5,991,395 A | 11/1999 | Miloslavsky |
| 5,995,606 A | 11/1999 | Civanlar et al. |
| 5,995,614 A | 11/1999 | Miloslavsky |
| 5,995,615 A | 11/1999 | Miloslavsky |
| 5,996,000 A | 11/1999 | Shuster |
| 5,999,525 A | 12/1999 | Krishnaswamy et al. |
| 5,999,609 A | 12/1999 | Nishimura |
| 5,999,965 A | 12/1999 | Kelly |
| 6,002,396 A | 12/1999 | Davies |
| 6,002,760 A | 12/1999 | Gisby |
| 6,003,034 A | 12/1999 | Tuli |
| 6,005,845 A | 12/1999 | Svennesson et al. |
| 6,005,920 A | 12/1999 | Fuller et al. |
| 6,005,931 A | 12/1999 | Neyman et al. |
| 6,009,163 A | 12/1999 | Nabkel et al. |
| 6,011,792 A | 1/2000 | Miloslavsky |
| 6,011,844 A | 1/2000 | Uppaluru et al. |
| 6,011,974 A | 1/2000 | Cedervall et al. |
| 6,012,152 A | 1/2000 | Douik et al. |
| 6,014,137 A | 1/2000 | Burns |
| 6,014,138 A | 1/2000 | Cain et al. |
| 6,014,379 A | 1/2000 | White et al. |
| 6,014,437 A | 1/2000 | Acker et al. |
| 6,014,647 A | 1/2000 | Nizzari et al. |
| 6,018,578 A | 1/2000 | Bondarenko et al. |
| 6,018,579 A | 1/2000 | Petrunka |
| 6,018,761 A | 1/2000 | Uomini |
| 6,021,262 A | 2/2000 | Cote et al. |
| 6,021,411 A | 2/2000 | Brophy et al. |
| 6,021,428 A | 2/2000 | Miloslavsky |
| 6,023,684 A | 2/2000 | Pearson |
| 6,023,723 A | 2/2000 | McCormick et al. |
| 6,026,087 A | 2/2000 | Mirashrafi et al. |
| 6,026,375 A | 2/2000 | Hall et al. |
| 6,028,917 A | 2/2000 | Creamer et al. |
| 6,029,195 A | 2/2000 | Herz |
| 6,038,293 A | 3/2000 | McNerney et al. |
| 6,038,537 A | 3/2000 | Matsuoka |
| 6,041,116 A | 3/2000 | Meyers |
| 6,044,144 A | 3/2000 | Becker et al. |
| 6,044,146 A | 3/2000 | Gisby et al. |
| 6,044,368 A | 3/2000 | Powers |
| 6,046,762 A | 4/2000 | Sonesh et al. |
| 6,047,060 A | 4/2000 | Fedorov et al. |
| 6,049,272 A | 4/2000 | Lee et al. |
| 6,049,547 A | 4/2000 | Fisher et al. |
| 6,049,779 A | 4/2000 | Berkson |
| 6,052,514 A | 4/2000 | Gill et al. |
| 6,055,307 A | 4/2000 | Behnke et al. |
| 6,055,308 A | 4/2000 | Miloslavsky et al. |
| 6,055,513 A | 4/2000 | Katz et al. |
| 6,058,163 A | 5/2000 | Pattison et al. |
| 6,058,389 A | 5/2000 | Chandra et al. |
| 6,058,435 A | 5/2000 | Sassin et al. |
| 6,061,054 A | 5/2000 | Jolly |
| 6,064,667 A | 5/2000 | Gisby et al. |
| 6,064,722 A | 5/2000 | Clise et al. |
| 6,064,723 A | 5/2000 | Cohn et al. |
| 6,064,730 A | 5/2000 | Ginsberg |
| 6,064,973 A | 5/2000 | Smith et al. |
| 6,067,357 A | 5/2000 | Kishinsky et al. |
| 6,069,890 A | 5/2000 | White et al. |
| 6,070,142 A | 5/2000 | McDonough et al. |
| 6,070,144 A | 5/2000 | Ginsberg et al. |
| 6,072,864 A | 6/2000 | Shtivelman et al. |
| 6,073,013 A | 6/2000 | Agre et al. |
| 6,073,105 A | 6/2000 | Sutcliffe et al. |
| 6,073,109 A | 6/2000 | Flores et al. |
| 6,073,124 A | 6/2000 | Krishnan et al. |
| 6,075,783 A | 6/2000 | Voit |
| 6,075,843 A | 6/2000 | Cave |
| 6,076,101 A | 6/2000 | Kamakura et al. |
| 6,076,105 A | 6/2000 | Wolff et al. |
| 6,078,581 A | 6/2000 | Shtivelman et al. |
| 6,078,583 A | 6/2000 | Takahara et al. |
| 6,081,591 A | 6/2000 | Skoog |
| 6,081,592 A | 6/2000 | Battle |
| 6,085,097 A | 7/2000 | Savery et al. |
| 6,085,201 A | 7/2000 | Tso |
| 6,088,340 A | 7/2000 | Buchholz et al. |
| 6,088,696 A | 7/2000 | Moon et al. |
| 6,088,717 A | 7/2000 | Reed et al. |
| 6,094,479 A | 7/2000 | Lindeberg et al. |
| 6,094,673 A | 7/2000 | Dilip et al. |
| 6,097,804 A | 8/2000 | Gilbert et al. |
| 6,097,938 A | 8/2000 | Paxson |
| 6,098,065 A | 8/2000 | Skillen et al. |
| 6,104,711 A | 8/2000 | Voit |
| 6,104,800 A | 8/2000 | Benson |
| 6,104,801 A | 8/2000 | Miloslavsky |
| 6,104,802 A | 8/2000 | Perlmutter |
| 6,108,688 A | 8/2000 | Nielsen |
| 6,108,711 A | 8/2000 | Beck et al. |
| 6,112,085 A | 8/2000 | Garner et al. |
| 6,115,596 A | 9/2000 | Raith et al. |
| 6,115,742 A | 9/2000 | Franklin et al. |
| 6,118,865 A | 9/2000 | Gisby |
| 6,119,155 A | 9/2000 | Rossmann et al. |
| 6,119,167 A | 9/2000 | Boyle et al. |
| 6,122,360 A | 9/2000 | Neyman et al. |
| 6,122,364 A | 9/2000 | Petrunka et al. |
| 6,122,365 A | 9/2000 | Yegoshin |
| 6,122,632 A | 9/2000 | Botts et al. |
| 6,125,113 A | 9/2000 | Farris et al. |
| 6,125,126 A | 9/2000 | Hallenst |
| 6,128,379 A | 10/2000 | Smyk |
| 6,128,482 A | 10/2000 | Nixon et al. |
| 6,128,603 A | 10/2000 | Dent et al. |
| 6,128,646 A | 10/2000 | Miloslavsky |
| 6,130,933 A | 10/2000 | Miloslavsky |
| 6,134,217 A | 10/2000 | Stiliadis et al. |
| 6,134,235 A | 10/2000 | Goldman et al. |
| 6,134,315 A | 10/2000 | Galvin |
| 6,134,318 A | 10/2000 | O'Neil |

(56) References Cited

U.S. PATENT DOCUMENTS

| | | |
|---|---|---|
| 6,134,530 A | 10/2000 | Bunting et al. |
| 6,137,870 A | 10/2000 | Scherer |
| 6,138,139 A | 10/2000 | Beck et al. |
| 6,141,345 A | 10/2000 | Goeddel et al. |
| 6,148,074 A | 11/2000 | Miloslavsky et al. |
| 6,157,653 A | 12/2000 | Kline et al. |
| 6,157,655 A | 12/2000 | Shtivelman |
| 6,157,924 A | 12/2000 | Austin |
| 6,166,735 A | 12/2000 | Dom et al. |
| 6,167,255 A | 12/2000 | Kennedy, III et al. |
| 6,167,395 A | 12/2000 | Beck et al. |
| 6,167,404 A | 12/2000 | Morcos et al. |
| 6,170,011 B1 | 1/2001 | Macleod Beck et al. |
| 6,173,052 B1 | 1/2001 | Brady |
| 6,173,316 B1 | 1/2001 | De Boor et al. |
| 6,175,562 B1 | 1/2001 | Cave |
| 6,175,563 B1 | 1/2001 | Miloslavsky |
| 6,175,564 B1 | 1/2001 | Miloslavsky et al. |
| 6,175,620 B1 | 1/2001 | Rouge et al. |
| 6,175,842 B1 | 1/2001 | Kirk et al. |
| 6,178,239 B1 | 1/2001 | Kishinsky et al. |
| 6,181,336 B1 | 1/2001 | Chiu et al. |
| 6,181,736 B1 | 1/2001 | McLaughlin et al. |
| 6,181,788 B1 | 1/2001 | Miloslavsky |
| 6,182,059 B1 | 1/2001 | Angotti et al. |
| 6,182,249 B1 | 1/2001 | Wookey et al. |
| 6,185,287 B1 | 2/2001 | Miloslavsky |
| 6,185,291 B1 | 2/2001 | Miloslavsky |
| 6,185,292 B1 | 2/2001 | Miloslavsky |
| 6,185,427 B1 | 2/2001 | Krasner et al. |
| 6,185,535 B1 | 2/2001 | Hedin et al. |
| 6,188,688 B1 | 2/2001 | Buskirk, Jr. |
| 6,192,250 B1 | 2/2001 | Buskens et al. |
| 6,195,357 B1 | 2/2001 | Polcyn |
| 6,198,738 B1 | 3/2001 | Chang et al. |
| 6,198,739 B1 | 3/2001 | Neyman et al. |
| 6,201,804 B1 | 3/2001 | Kikinis |
| 6,201,863 B1 | 3/2001 | Miloslavsky |
| 6,205,135 B1 | 3/2001 | Chinni et al. |
| 6,205,412 B1 | 3/2001 | Barskiy et al. |
| 6,212,178 B1 | 4/2001 | Beck et al. |
| 6,215,783 B1 | 4/2001 | Neyman |
| 6,219,045 B1 | 4/2001 | Leahy et al. |
| 6,219,413 B1 | 4/2001 | Burg |
| 6,222,919 B1 | 4/2001 | Hollatz et al. |
| 6,226,285 B1 | 5/2001 | Kozdon et al. |
| 6,229,524 B1 | 5/2001 | Chernock et al. |
| 6,229,888 B1 | 5/2001 | Miloslavsky |
| 6,230,197 B1 | 5/2001 | Beck et al. |
| 6,233,234 B1 | 5/2001 | Curry et al. |
| 6,233,616 B1 | 5/2001 | Reid |
| 6,236,857 B1 | 5/2001 | Calabrese et al. |
| 6,240,285 B1 | 5/2001 | Blum et al. |
| 6,243,092 B1 | 6/2001 | Okita et al. |
| 6,243,373 B1 | 6/2001 | Turock |
| 6,243,375 B1 | 6/2001 | Speicher |
| 6,243,379 B1 | 6/2001 | Veerina et al. |
| 6,243,713 B1 | 6/2001 | Nelson et al. |
| 6,249,807 B1 | 6/2001 | Shaw et al. |
| 6,253,129 B1 | 6/2001 | Jenkins et al. |
| 6,256,489 B1 | 7/2001 | Lichter et al. |
| 6,256,503 B1 | 7/2001 | Stephens |
| 6,259,692 B1 | 7/2001 | Shtivelman et al. |
| 6,259,774 B1 | 7/2001 | Miloslavsky |
| 6,259,786 B1 | 7/2001 | Gisby |
| 6,263,049 B1 | 7/2001 | Kuhn |
| 6,263,065 B1 | 7/2001 | Durinovic-Johri et al. |
| 6,263,066 B1 | 7/2001 | Shtivelman et al. |
| 6,263,359 B1 | 7/2001 | Fong et al. |
| 6,275,693 B1 | 8/2001 | Lin et al. |
| 6,278,996 B1 | 8/2001 | Richardson et al. |
| 6,282,429 B1 | 8/2001 | Baiyor et al. |
| 6,282,565 B1 | 8/2001 | Shaw et al. |
| 6,285,316 B1 | 9/2001 | Nir et al. |
| 6,285,364 B1 | 9/2001 | Giordano, III et al. |
| 6,286,033 B1 | 9/2001 | Kishinsky et al. |
| 6,286,084 B1 | 9/2001 | Wexler et al. |
| 6,286,129 B1 | 9/2001 | Agarwal et al. |
| 6,289,094 B1 | 9/2001 | Miloslavsky |
| 6,292,181 B1 | 9/2001 | Banerjee et al. |
| 6,292,553 B1 | 9/2001 | Fellingham et al. |
| 6,295,353 B1 | 9/2001 | Flockhart et al. |
| 6,295,530 B1 | 9/2001 | Ritchie et al. |
| 6,298,041 B1 | 10/2001 | Packer |
| 6,301,480 B1 | 10/2001 | Kennedy, III et al. |
| 6,304,898 B1 | 10/2001 | Shiigi |
| 6,314,089 B1 | 11/2001 | Szlam et al. |
| 6,314,430 B1 | 11/2001 | Chang |
| 6,320,857 B1 | 11/2001 | Tonnby et al. |
| 6,320,951 B1 | 11/2001 | Shtivelman et al. |
| 6,324,276 B1 | 11/2001 | Uppaluru et al. |
| 6,330,323 B1 | 12/2001 | Gottlieb et al. |
| 6,330,426 B2 | 12/2001 | Brown et al. |
| 6,332,022 B1 | 12/2001 | Martinez |
| 6,332,154 B2 | 12/2001 | Beck et al. |
| 6,332,163 B1 | 12/2001 | Bowman-Amuah |
| 6,333,980 B1 | 12/2001 | Hollatz et al. |
| 6,335,927 B1 | 1/2002 | Elliott et al. |
| 6,337,904 B1 | 1/2002 | Gisby |
| 6,339,593 B1 | 1/2002 | Kikinis |
| 6,343,281 B1 | 1/2002 | Kato |
| 6,345,290 B2 | 2/2002 | Okada et al. |
| 6,345,300 B1 | 2/2002 | Bakshi et al. |
| 6,345,305 B1 | 2/2002 | Beck et al. |
| 6,346,952 B1 | 2/2002 | Shtivelman |
| 6,347,085 B2 | 2/2002 | Kelly |
| 6,353,608 B1 | 3/2002 | Cullers et al. |
| 6,353,667 B1 | 3/2002 | Foster et al. |
| 6,359,981 B1 | 3/2002 | Neyman et al. |
| 6,362,838 B1 | 3/2002 | Szlam et al. |
| 6,363,411 B1 | 3/2002 | Dugan et al. |
| 6,366,575 B1 | 4/2002 | Barkan et al. |
| 6,366,586 B1 | 4/2002 | Christie |
| 6,366,651 B1 | 4/2002 | Griffith et al. |
| 6,366,658 B1 | 4/2002 | Bjornberg et al. |
| 6,366,925 B1 | 4/2002 | Meltzer et al. |
| 6,370,238 B1 | 4/2002 | Sansone et al. |
| 6,370,508 B2 | 4/2002 | Beck et al. |
| 6,370,567 B1 | 4/2002 | Ouchi |
| 6,373,836 B1 | 4/2002 | Deryugin et al. |
| 6,373,937 B1 | 4/2002 | Yegoshin |
| 6,377,568 B1 | 4/2002 | Kelly |
| 6,377,583 B1 | 4/2002 | Lyles et al. |
| 6,377,944 B1 | 4/2002 | Busey et al. |
| 6,377,975 B1 | 4/2002 | Florman |
| 6,381,640 B1 | 4/2002 | Beck et al. |
| 6,385,191 B1 | 5/2002 | Coffman et al. |
| 6,385,202 B1 | 5/2002 | Katseff et al. |
| 6,385,646 B1 | 5/2002 | Brown et al. |
| 6,389,007 B1 | 5/2002 | Shenkman et al. |
| 6,389,133 B1 | 5/2002 | Kamen |
| 6,393,018 B2 | 5/2002 | Miloslavsky |
| 6,393,122 B1 | 5/2002 | Belzile |
| 6,393,481 B1 | 5/2002 | Deo et al. |
| 6,396,834 B1 | 5/2002 | Bonomi et al. |
| 6,396,919 B1 | 5/2002 | Shimada et al. |
| 6,400,725 B1 | 6/2002 | Ross |
| 6,401,094 B1 | 6/2002 | Stemp et al. |
| 6,405,033 B1 | 6/2002 | Kennedy, III et al. |
| 6,407,996 B1 | 6/2002 | Witchalls |
| 6,407,999 B1 | 6/2002 | Olkkonen et al. |
| 6,408,064 B1 | 6/2002 | Fedorov et al. |
| 6,411,806 B1 | 6/2002 | Garner et al. |
| 6,418,146 B1 | 7/2002 | Miloslavsky |
| 6,418,199 B1 | 7/2002 | Perrone |
| 6,424,709 B1 | 7/2002 | Doyle et al. |
| 6,427,002 B2 | 7/2002 | Campbell et al. |
| 6,430,174 B1 | 8/2002 | Jennings et al. |
| 6,430,282 B1 | 8/2002 | Bannister et al. |
| 6,434,231 B2 | 8/2002 | Neyman et al. |
| 6,434,530 B1 | 8/2002 | Sloane et al. |
| 6,434,549 B1 | 8/2002 | Linetsky et al. |
| 6,442,242 B1 | 8/2002 | McAllister et al. |
| 6,442,247 B1 | 8/2002 | Garcia |

(56) References Cited

U.S. PATENT DOCUMENTS

| | | |
|---|---|---|
| 6,445,788 B1 | 9/2002 | Torba |
| 6,449,260 B1 | 9/2002 | Sassin et al. |
| 6,449,270 B1 | 9/2002 | Miloslavsky |
| 6,449,358 B1 | 9/2002 | Anisimov et al. |
| 6,449,646 B1 | 9/2002 | Sikora et al. |
| 6,452,609 B1 | 9/2002 | Katinsky et al. |
| 6,453,038 B1 | 9/2002 | McFarlane et al. |
| 6,453,341 B1 | 9/2002 | Miloslavsky |
| 6,456,615 B1 | 9/2002 | Kikinis |
| 6,456,619 B1 | 9/2002 | Sassin et al. |
| 6,459,697 B1 | 10/2002 | Neyman |
| 6,463,148 B1 | 10/2002 | Brady |
| 6,470,010 B1 | 10/2002 | Szviatovszki et al. |
| 6,470,080 B2 | 10/2002 | Perlmutter |
| 6,473,787 B2 | 10/2002 | Miloslavsky |
| 6,480,600 B1 | 11/2002 | Neyman et al. |
| 6,487,663 B1 | 11/2002 | Jaisimha et al. |
| 6,490,350 B2 | 12/2002 | McDuff et al. |
| 6,493,447 B1 | 12/2002 | Goss et al. |
| 6,496,567 B1 | 12/2002 | Bjornberg et al. |
| 6,496,702 B1 | 12/2002 | Lockhart |
| 6,496,981 B1 | 12/2002 | Wistendahl et al. |
| 6,498,897 B1 | 12/2002 | Nelson et al. |
| 6,499,088 B1 | 12/2002 | Wexler et al. |
| 6,512,825 B1 | 1/2003 | Lindholm et al. |
| 6,515,996 B1 | 2/2003 | Tonnby et al. |
| 6,519,617 B1 | 2/2003 | Wanderski et al. |
| 6,532,493 B1 | 3/2003 | Aviani, Jr. et al. |
| 6,535,492 B2 | 3/2003 | Shtivelman |
| 6,536,043 B1 | 3/2003 | Guedalia |
| 6,539,419 B2 | 3/2003 | Beck et al. |
| 6,546,405 B2 | 4/2003 | Gupta et al. |
| 6,549,539 B1 | 4/2003 | Neyman |
| 6,553,114 B1 | 4/2003 | Fisher et al. |
| 6,554,183 B1 | 4/2003 | Sticha et al. |
| 6,560,328 B1 | 5/2003 | Bondarenko et al. |
| 6,560,329 B1 | 5/2003 | Draginich et al. |
| 6,563,788 B1 | 5/2003 | Torba et al. |
| 6,581,105 B2 | 6/2003 | Miloslavsky et al. |
| 6,594,269 B1 | 7/2003 | Polcyn |
| 6,597,685 B2 | 7/2003 | Miloslavsky et al. |
| 6,600,733 B2 | 7/2003 | Deng |
| 6,600,822 B2 | 7/2003 | Kamen |
| 6,603,762 B1 | 8/2003 | Kikinis |
| 6,611,498 B1 | 8/2003 | Baker et al. |
| 6,611,590 B1 | 8/2003 | Lu et al. |
| 6,614,780 B2 | 9/2003 | Hakim et al. |
| 6,625,139 B2 | 9/2003 | Miloslavsky et al. |
| 6,628,666 B1 | 9/2003 | Pickering et al. |
| 6,631,399 B1 | 10/2003 | Stanczak et al. |
| 6,633,910 B1 | 10/2003 | Rajan et al. |
| 6,650,747 B1 | 11/2003 | Bala et al. |
| 6,651,085 B1 | 11/2003 | Woods |
| 6,668,286 B2 | 12/2003 | Bateman et al. |
| 6,678,718 B1 | 1/2004 | Khouri et al. |
| 6,681,010 B1 | 1/2004 | Anderson et al. |
| 6,687,241 B1 | 2/2004 | Goss |
| 6,693,893 B1 | 2/2004 | Ehlinger |
| 6,704,409 B1 | 3/2004 | Dilip et al. |
| 6,704,410 B1 | 3/2004 | McFarlane et al. |
| 6,704,411 B1 | 3/2004 | Nishidate |
| 6,707,903 B2 | 3/2004 | Burok et al. |
| 6,711,249 B2 | 3/2004 | Weissman et al. |
| 6,711,611 B2 | 3/2004 | Hanhan |
| 6,714,643 B1 | 3/2004 | Gargeya et al. |
| 6,718,032 B1 | 4/2004 | Vrenjak et al. |
| 6,718,366 B2 | 4/2004 | Beck et al. |
| 6,721,306 B1 | 4/2004 | Farris et al. |
| 6,731,626 B1 | 5/2004 | Neyman |
| 6,735,298 B2 | 5/2004 | Neyman et al. |
| 6,744,877 B1 | 6/2004 | Edwards |
| 6,744,878 B1 | 6/2004 | Komissarchik et al. |
| 6,748,211 B1 | 6/2004 | Isaac et al. |
| 6,751,210 B1 | 6/2004 | Shaffer et al. |
| 6,753,784 B1 | 6/2004 | Sznaider et al. |
| 6,754,181 B1 | 6/2004 | Elliott et al. |
| 6,760,322 B1 | 7/2004 | Fukuda et al. |
| 6,760,324 B1 | 7/2004 | Scott et al. |
| 6,760,428 B2 | 7/2004 | Foster |
| 6,760,727 B1 | 7/2004 | Schroeder et al. |
| 6,763,104 B1 | 7/2004 | Judkins et al. |
| 6,763,369 B1 | 7/2004 | Ytuarte et al. |
| 6,771,765 B1 | 8/2004 | Crowther et al. |
| 6,778,527 B1 | 8/2004 | Amin |
| 6,785,375 B1 | 8/2004 | Beddus et al. |
| 6,785,710 B1 | 8/2004 | Kikinis |
| 6,785,740 B1 | 8/2004 | Yoneda et al. |
| 6,788,779 B2 | 9/2004 | Ostapchuck |
| 6,798,771 B1 | 9/2004 | Low et al. |
| 6,801,520 B2 | 10/2004 | Philonenko |
| 6,801,928 B2 | 10/2004 | Nuestro |
| 6,804,346 B1 | 10/2004 | Mewhinney |
| 6,816,871 B2 | 11/2004 | Lee |
| 6,816,878 B1 | 11/2004 | Zimmers et al. |
| 6,845,154 B1 | 1/2005 | Cave et al. |
| 6,847,715 B1 | 1/2005 | Swartz |
| 6,847,825 B1 | 1/2005 | Duvall et al. |
| 6,850,602 B1 | 2/2005 | Chou |
| 6,859,529 B2 | 2/2005 | Duncan et al. |
| 6,865,267 B2 | 3/2005 | Dezonno |
| 6,868,391 B1 | 3/2005 | Hultgren |
| 6,874,119 B2 | 3/2005 | Macleod Beck et al. |
| 6,876,632 B1 | 4/2005 | Takeda |
| 6,879,586 B2 | 4/2005 | Miloslavsky et al. |
| 6,882,996 B2 | 4/2005 | Preisig et al. |
| 6,898,190 B2 | 5/2005 | Shtivelman et al. |
| 6,903,685 B1 | 6/2005 | Arndt et al. |
| 6,907,455 B1 | 6/2005 | Wolfe et al. |
| 6,910,072 B2 | 6/2005 | Macleod Beck et al. |
| 6,912,272 B2 | 6/2005 | Kirk et al. |
| 6,922,411 B1 | 7/2005 | Taylor |
| 6,922,689 B2 | 7/2005 | Shtivelman |
| 6,934,379 B2 | 8/2005 | Falcon et al. |
| 6,934,381 B1 | 8/2005 | Klein et al. |
| 6,944,272 B1 | 9/2005 | Thomas |
| 6,958,994 B2 | 10/2005 | Zhakov et al. |
| 6,965,914 B2 | 11/2005 | Dowling |
| 6,970,844 B1 | 11/2005 | Bierenbaum |
| 6,977,740 B1 | 12/2005 | Mandalia |
| 6,981,020 B2 | 12/2005 | Miloslavsky et al. |
| 6,985,478 B2 | 1/2006 | Pogossiants et al. |
| 6,985,943 B2 | 1/2006 | Deryugin et al. |
| 6,987,977 B2 | 1/2006 | Lockhart |
| 6,996,603 B1 | 2/2006 | Srinivasan |
| 7,020,264 B1 | 3/2006 | Neyman et al. |
| 7,031,442 B1 | 4/2006 | Neyman et al. |
| 7,039,176 B2 | 5/2006 | Borodow et al. |
| 7,039,857 B2 | 5/2006 | Beck et al. |
| 7,076,048 B2 | 7/2006 | Lee et al. |
| 7,079,641 B2 | 7/2006 | Ostapchuck |
| 7,080,092 B2 | 7/2006 | Upton |
| 7,088,814 B1 | 8/2006 | Shaffer et al. |
| 7,092,509 B1 | 8/2006 | Mears et al. |
| 7,106,850 B2 | 9/2006 | Campbell et al. |
| 7,110,523 B2 | 9/2006 | Gagle et al. |
| 7,110,525 B1 | 9/2006 | Heller et al. |
| 7,117,244 B2 | 10/2006 | Florman et al. |
| 7,120,700 B2 | 10/2006 | Macleod Beck et al. |
| 7,127,400 B2 | 10/2006 | Koch |
| 7,133,830 B1 | 11/2006 | Hoban et al. |
| 7,136,475 B1 | 11/2006 | Rogers et al. |
| 7,155,496 B2 | 12/2006 | Froyd et al. |
| 7,155,512 B2 | 12/2006 | Lean et al. |
| 7,159,224 B2 | 1/2007 | Sharma et al. |
| 7,167,924 B1 | 1/2007 | Symonds et al. |
| 7,184,747 B2 | 2/2007 | Bogat |
| 7,216,350 B2 | 5/2007 | Martin et al. |
| 7,221,377 B1 | 5/2007 | Okita et al. |
| 7,222,301 B2 | 5/2007 | Makagon et al. |
| 7,231,032 B2 | 6/2007 | Nevman et al. |
| 7,236,486 B2 | 6/2007 | Baker et al. |
| 7,236,584 B2 | 6/2007 | Torba |
| 7,242,760 B2 | 7/2007 | Shires |
| 7,246,009 B2 | 7/2007 | Hamblen et al. |

(56) References Cited

U.S. PATENT DOCUMENTS

| | | |
|---|---|---|
| 7,254,219 B1 | 8/2007 | Hansen et al. |
| 7,254,641 B2 | 8/2007 | Broughton et al. |
| 7,263,372 B2 | 8/2007 | Lockhart |
| 7,263,671 B2 | 8/2007 | Hull et al. |
| 7,269,263 B2 | 9/2007 | Dedieu et al. |
| 7,272,627 B2 | 9/2007 | Petrovykh |
| 7,277,536 B2 | 10/2007 | Ostapchuk |
| 7,277,916 B2 | 10/2007 | Nuestro |
| 7,283,519 B2 | 10/2007 | Girard |
| 7,336,649 B1 | 2/2008 | Huang |
| 7,363,228 B2 | 4/2008 | Wyss et al. |
| 7,372,956 B1 | 5/2008 | Kikinis et al. |
| 7,373,405 B2 | 5/2008 | Deryugin et al. |
| 7,373,410 B2 | 5/2008 | Monza et al. |
| 7,376,227 B2 | 5/2008 | Anisimov et al. |
| 7,376,431 B2 | 5/2008 | Niedermeyer |
| 7,401,112 B1 | 7/2008 | Matz et al. |
| 7,415,009 B2 | 8/2008 | Neyman |
| 7,418,094 B2 | 8/2008 | Golitsin et al. |
| 7,428,303 B2 | 9/2008 | Campbell et al. |
| 7,434,204 B1 | 10/2008 | Everingham et al. |
| 7,460,496 B2 | 12/2008 | Miloslavsky et al. |
| 7,496,640 B2 | 2/2009 | Hanhan |
| 7,535,479 B2 | 5/2009 | Okita et al. |
| 7,558,383 B2 | 7/2009 | Shtivelman et al. |
| 7,561,887 B2 | 7/2009 | Lockhart |
| 7,565,428 B2 | 7/2009 | Deryugin et al. |
| 7,609,829 B2 | 10/2009 | Wang et al. |
| 7,610,347 B2 | 10/2009 | Petrovykh |
| 7,619,996 B2 | 11/2009 | Miloslavsky et al. |
| 7,669,182 B2 | 2/2010 | Garcia |
| 7,672,998 B1 | 3/2010 | Haskins et al. |
| 7,706,520 B1 | 4/2010 | Waterson et al. |
| 7,715,332 B2 | 5/2010 | Miloslavsky et al. |
| 7,716,292 B2 | 5/2010 | Kikinis |
| 7,739,325 B1 | 6/2010 | Okita et al. |
| 7,764,231 B1 | 7/2010 | Karr et al. |
| 7,769,161 B1 | 8/2010 | Hession et al. |
| 7,779,067 B2 | 8/2010 | Beck et al. |
| 7,792,773 B2 | 9/2010 | McCord et al. |
| 7,808,977 B2 | 10/2010 | Kikinis |
| 7,823,167 B2 | 10/2010 | Makagon et al. |
| 7,853,717 B2 | 12/2010 | Petrovykh |
| 7,856,095 B2 | 12/2010 | Brown |
| 7,903,807 B2 | 3/2011 | Neyman et al. |
| 7,907,598 B2 | 3/2011 | Anisimov et al. |
| 7,929,978 B2 | 4/2011 | Lockhart |
| 8,009,821 B1 | 8/2011 | Apparao et al. |
| 8,018,921 B2 | 9/2011 | Pogossiants et al. |
| 8,031,698 B2 | 10/2011 | Neyman |
| 8,059,812 B1 | 11/2011 | Bundy |
| 8,068,598 B1 | 11/2011 | Russi et al. |
| 8,126,133 B1 | 2/2012 | Everingham et al. |
| 8,130,749 B2 | 3/2012 | Kikinis |
| 8,180,662 B2 | 5/2012 | Minert et al. |
| 8,180,666 B2 | 5/2012 | Minert et al. |
| 8,199,891 B2 | 6/2012 | Brown et al. |
| 8,209,207 B2 | 6/2012 | Minert et al. |
| 8,209,209 B2 | 6/2012 | Minert et al. |
| 8,223,948 B2 | 7/2012 | Minert et al. |
| 8,226,477 B1 | 7/2012 | Machado et al. |
| 8,254,558 B2 | 8/2012 | Minert et al. |
| 8,275,111 B2 | 9/2012 | Golitsin et al. |
| 8,345,856 B1 | 1/2013 | Anisimov et al. |
| 8,351,595 B2 | 1/2013 | Peterson et al. |
| 8,358,769 B2 | 1/2013 | Neyman et al. |
| 8,395,994 B2 | 3/2013 | Stevenson et al. |
| 8,396,205 B1 | 3/2013 | Lowry et al. |
| 8,411,844 B1 | 4/2013 | Anisimov et al. |
| 2001/0000458 A1 | 4/2001 | Shtivelman et al. |
| 2001/0001150 A1 | 5/2001 | Miloslavsky |
| 2001/0011366 A1 | 8/2001 | Beck et al. |
| 2001/0013041 A1 | 8/2001 | Macleod Beck et al. |
| 2001/0014604 A1 | 8/2001 | Kingdon et al. |
| 2001/0023430 A1 | 9/2001 | Srinivasan |
| 2001/0023448 A1 | 9/2001 | Hanhan |
| 2001/0024497 A1 | 9/2001 | Campbell et al. |
| 2001/0025309 A1 | 9/2001 | Macleod Beck et al. |
| 2001/0028649 A1 | 10/2001 | Pogossiants et al. |
| 2001/0029519 A1 | 10/2001 | Hallinan et al. |
| 2001/0037316 A1 | 11/2001 | Shiloh |
| 2001/0038624 A1 | 11/2001 | Greenberg et al. |
| 2001/0040887 A1 | 11/2001 | Shtivelman et al. |
| 2001/0042095 A1 | 11/2001 | Kim et al. |
| 2001/0043586 A1 | 11/2001 | Miloslavsky |
| 2001/0043589 A1 | 11/2001 | Kikinis |
| 2001/0044676 A1 | 11/2001 | Macleod Beck et al. |
| 2001/0044828 A1 | 11/2001 | Kikinis |
| 2001/0054064 A1 | 12/2001 | Kannan |
| 2002/0001300 A1 | 1/2002 | Miloslavsky et al. |
| 2002/0012428 A1 | 1/2002 | Neyman et al. |
| 2002/0013150 A1 | 1/2002 | McKenna et al. |
| 2002/0019844 A1 | 2/2002 | Kurowski et al. |
| 2002/0019846 A1 | 2/2002 | Miloslavsky et al. |
| 2002/0025819 A1 | 2/2002 | Cetusic et al. |
| 2002/0035647 A1 | 3/2002 | Brown et al. |
| 2002/0037076 A1 | 3/2002 | Perlmutter |
| 2002/0041674 A1 | 4/2002 | Kamen |
| 2002/0054579 A1 | 5/2002 | Miloslavsky |
| 2002/0055853 A1 | 5/2002 | Macleod Beck et al. |
| 2002/0056000 A1 | 5/2002 | Albert Coussement |
| 2002/0057671 A1 | 5/2002 | Kikinis |
| 2002/0059164 A1 | 5/2002 | Shtivelman |
| 2002/0059374 A1 | 5/2002 | Nuestro |
| 2002/0060988 A1 | 5/2002 | Shtivelman |
| 2002/0062385 A1 | 5/2002 | Dowling |
| 2002/0064149 A1 | 5/2002 | Elliott et al. |
| 2002/0076031 A1 | 6/2002 | Falcon et al. |
| 2002/0078150 A1 | 6/2002 | Thompson et al. |
| 2002/0087648 A1 | 7/2002 | Petrovykh |
| 2002/0091726 A1 | 7/2002 | Macleod Beck et al. |
| 2002/0095462 A1 | 7/2002 | Beck et al. |
| 2002/0097708 A1 | 7/2002 | Deng |
| 2002/0099738 A1 | 7/2002 | Grant |
| 2002/0101866 A1 | 8/2002 | Miloslavsky et al. |
| 2002/0101880 A1 | 8/2002 | Kim |
| 2002/0103998 A1 | 8/2002 | DeBruine |
| 2002/0105957 A1 | 8/2002 | Bondarenko et al. |
| 2002/0114278 A1 | 8/2002 | Coussement |
| 2002/0114441 A1 | 8/2002 | Coussement |
| 2002/0120719 A1 | 8/2002 | Lee et al. |
| 2002/0123899 A1 | 9/2002 | Hall et al. |
| 2002/0126828 A1 | 9/2002 | Kamen |
| 2002/0131399 A1 | 9/2002 | Philonenko |
| 2002/0136167 A1 | 9/2002 | Steele et al. |
| 2002/0150311 A1 | 10/2002 | Lynn |
| 2002/0169834 A1 | 11/2002 | Miloslavsky et al. |
| 2003/0002479 A1 | 1/2003 | Vortman et al. |
| 2003/0002652 A1 | 1/2003 | Neyman et al. |
| 2003/0002654 A1 | 1/2003 | Torba |
| 2003/0007621 A1 | 1/2003 | Graves et al. |
| 2003/0009530 A1 | 1/2003 | Philonenko et al. |
| 2003/0018702 A1 | 1/2003 | Broughton et al. |
| 2003/0018729 A1 | 1/2003 | Miloslavsky |
| 2003/0021259 A1 | 1/2003 | Miloslavsky et al. |
| 2003/0021406 A1 | 1/2003 | Ostapchuk |
| 2003/0026414 A1 | 2/2003 | Baker et al. |
| 2003/0037113 A1 | 2/2003 | Petrovykh |
| 2003/0043832 A1 | 3/2003 | Anisimov et al. |
| 2003/0051037 A1 | 3/2003 | Sundaram et al. |
| 2003/0055884 A1 | 3/2003 | Yuen et al. |
| 2003/0058884 A1 | 3/2003 | Kallner et al. |
| 2003/0084128 A1 | 5/2003 | Anderson et al. |
| 2003/0084349 A1 | 5/2003 | Friedrichs et al. |
| 2003/0088421 A1 | 5/2003 | Maes et al. |
| 2003/0097457 A1 | 5/2003 | Saran et al. |
| 2003/0099343 A1 | 5/2003 | Dezonno |
| 2003/0115353 A1 | 6/2003 | Deryugin et al. |
| 2003/0125048 A1 | 7/2003 | Lockhart |
| 2003/0135592 A1 | 7/2003 | Vetter et al. |
| 2003/0161448 A1 | 8/2003 | Parolkar et al. |
| 2003/0179729 A1 | 9/2003 | MacLeod Beck et al. |
| 2003/0212558 A1 | 11/2003 | Matula |
| 2003/0216923 A1 | 11/2003 | Gilmore et al. |

(56) References Cited

U.S. PATENT DOCUMENTS

| | | |
|---|---|---|
| 2003/0220875 A1 | 11/2003 | Lam et al. |
| 2003/0229529 A1 | 12/2003 | Mui et al. |
| 2004/0017797 A1 | 1/2004 | Chen et al. |
| 2004/0019638 A1 | 1/2004 | Makagon et al. |
| 2004/0030557 A1 | 2/2004 | Culy et al. |
| 2004/0047302 A1* | 3/2004 | Dezonno et al. ............. 370/270 |
| 2004/0064348 A1 | 4/2004 | Humenansky et al. |
| 2004/0081183 A1 | 4/2004 | Monza et al. |
| 2004/0083195 A1 | 4/2004 | McCord et al. |
| 2004/0083281 A1 | 4/2004 | Makagon et al. |
| 2004/0083479 A1 | 4/2004 | Bondarenko et al. |
| 2004/0083482 A1 | 4/2004 | Makagon et al. |
| 2004/0102977 A1 | 5/2004 | Metzler et al. |
| 2004/0107025 A1 | 6/2004 | Ransom et al. |
| 2004/0111269 A1 | 6/2004 | Koch |
| 2004/0120502 A1 | 6/2004 | Strathmeyer et al. |
| 2004/0169675 A1 | 9/2004 | Beck et al. |
| 2004/0179516 A1 | 9/2004 | Neyman |
| 2004/0181574 A1 | 9/2004 | Hanhan |
| 2004/0199580 A1 | 10/2004 | Zhakov et al. |
| 2004/0208134 A1 | 10/2004 | Neyman et al. |
| 2004/0208309 A1 | 10/2004 | Miloslavsky |
| 2004/0213400 A1 | 10/2004 | Golitsin et al. |
| 2004/0264678 A1 | 12/2004 | Ostapchuck |
| 2004/0267892 A1 | 12/2004 | Kikinis |
| 2005/0013417 A1 | 1/2005 | Zimmers et al. |
| 2005/0033851 A1 | 2/2005 | Kikinis |
| 2005/0041678 A1 | 2/2005 | Nuestro |
| 2005/0128961 A1* | 6/2005 | Miloslavsky et al. ......... 370/270 |
| 2005/0147090 A1 | 7/2005 | MacLeod Beck et al. |
| 2005/0154792 A1 | 7/2005 | Deryugin et al. |
| 2005/0207559 A1 | 9/2005 | Shtivelman et al. |
| 2006/0029206 A1 | 2/2006 | Anisimov et al. |
| 2006/0034262 A1 | 2/2006 | Pogossiants et al. |
| 2006/0079250 A1 | 4/2006 | Lockhart |
| 2006/0080107 A1 | 4/2006 | Hill et al. |
| 2006/0095568 A1 | 5/2006 | Makagon et al. |
| 2006/0109976 A1 | 5/2006 | Sundaram et al. |
| 2006/0133594 A1 | 6/2006 | Neyman et al. |
| 2006/0153173 A1* | 7/2006 | Beck et al. .................... 370/352 |
| 2006/0209797 A1 | 9/2006 | Anisimov et al. |
| 2006/0210047 A1 | 9/2006 | Neyman et al. |
| 2006/0245421 A1 | 11/2006 | Ostapchuk |
| 2007/0002744 A1 | 1/2007 | Mewhinney et al. |
| 2007/0041525 A1 | 2/2007 | Tingley et al. |
| 2007/0041567 A1 | 2/2007 | Anisimov et al. |
| 2007/0071224 A1 | 3/2007 | Shtivelman et al. |
| 2007/0143301 A1 | 6/2007 | Tran |
| 2007/0195940 A1 | 8/2007 | Miloslavsky et al. |
| 2007/0213073 A1 | 9/2007 | Lockhart |
| 2007/0274495 A1 | 11/2007 | Youd et al. |
| 2008/0002822 A1 | 1/2008 | Petrovykh |
| 2008/0013531 A1* | 1/2008 | Elliott et al. .................. 370/356 |
| 2008/0043728 A1 | 2/2008 | Miloslavsky et al. |
| 2008/0043955 A1 | 2/2008 | Shtivelman et al. |
| 2008/0043975 A1 | 2/2008 | Miloslavsky et al. |
| 2008/0043977 A1 | 2/2008 | Neyman et al. |
| 2008/0046504 A1 | 2/2008 | Deryugin et al. |
| 2008/0046531 A1 | 2/2008 | Shtivelman et al. |
| 2008/0049731 A1 | 2/2008 | Kikinis |
| 2008/0049737 A1 | 2/2008 | Neyman |
| 2008/0049928 A1 | 2/2008 | Miloslavsky et al. |
| 2008/0049929 A1 | 2/2008 | Miloslavsky et al. |
| 2008/0062971 A1 | 3/2008 | Kikinis |
| 2008/0130844 A1 | 6/2008 | Hubbard et al. |
| 2008/0205378 A1 | 8/2008 | Wyss et al. |
| 2008/0222240 A1 | 9/2008 | Deryugin et al. |
| 2008/0285739 A1 | 11/2008 | Golitsin et al. |
| 2009/0089136 A1 | 4/2009 | Minert et al. |
| 2009/0089451 A1 | 4/2009 | Petrovykh |
| 2009/0227267 A1 | 9/2009 | Lockhart |
| 2009/0240346 A1* | 9/2009 | Cadigan et al. .................... 700/2 |
| 2010/0157979 A1 | 6/2010 | Anisimov et al. |
| 2010/0198930 A1 | 8/2010 | Kikinis |
| 2011/0099602 A1 | 4/2011 | Apparao et al. |
| 2011/0178946 A1 | 7/2011 | Minert et al. |
| 2011/0179304 A1 | 7/2011 | Peterson |
| 2011/0179398 A1 | 7/2011 | Peterson |
| 2011/0182418 A1 | 7/2011 | Anisimov et al. |
| 2012/0047266 A1 | 2/2012 | Minert |
| 2012/0066016 A1 | 3/2012 | Minert et al. |
| 2012/0195415 A1 | 8/2012 | Wyss et al. |
| 2013/0016115 A1 | 1/2013 | Minert et al. |
| 2013/0129067 A1 | 5/2013 | Neyman et al. |
| 2013/0230160 A1 | 9/2013 | Neyman et al. |

FOREIGN PATENT DOCUMENTS

| | | |
|---|---|---|
| AT | 316736 | 2/2006 |
| AT | 317621 | 2/2006 |
| AT | 318048 | 3/2006 |
| AT | 337678 | 9/2006 |
| AT | 379921 | 12/2007 |
| AT | 380434 | 12/2007 |
| AT | 384398 | 2/2008 |
| AT | 388578 | 3/2008 |
| AT | 401736 | 8/2008 |
| AT | 413059 | 11/2008 |
| AT | 424090 | 3/2009 |
| AT | 465451 | 5/2010 |
| AT | 474415 | 7/2010 |
| AU | 2604797 | 10/1997 |
| AU | 718233 B2 | 3/1998 |
| AU | 5274398 | 3/1998 |
| AU | 6023598 | 8/1998 |
| AU | 6034698 | 8/1998 |
| AU | 6167398 | 8/1998 |
| AU | 6319498 | 8/1998 |
| AU | 6655298 | 9/1998 |
| AU | 6655398 | 9/1998 |
| AU | 7099298 | 10/1998 |
| AU | 735134 B2 | 3/1999 |
| AU | 736449 B2 | 4/1999 |
| AU | 737483 B2 | 4/1999 |
| AU | 743217 B2 | 4/1999 |
| AU | 745404 B2 | 4/1999 |
| AU | 748636 B2 | 4/1999 |
| AU | 9225198 | 4/1999 |
| AU | 9228098 | 4/1999 |
| AU | 9381998 | 4/1999 |
| AU | 9479298 | 4/1999 |
| AU | 743880 B2 | 5/1999 |
| AU | 1118899 | 5/1999 |
| AU | 740090 B2 | 6/1999 |
| AU | 743737 B2 | 6/1999 |
| AU | 744340 B2 | 6/1999 |
| AU | 1120099 | 6/1999 |
| AU | 1276799 | 6/1999 |
| AU | 1286299 | 6/1999 |
| AU | 741437 B2 | 8/1999 |
| AU | 758713 B2 | 8/1999 |
| AU | 2595499 | 8/1999 |
| AU | 2595599 | 8/1999 |
| AU | 2667299 | 8/1999 |
| AU | 2674899 | 8/1999 |
| AU | 739979 B2 | 9/1999 |
| AU | 2674799 | 9/1999 |
| AU | 749023 B2 | 12/1999 |
| AU | 4427299 | 12/1999 |
| AU | 4819499 | 12/1999 |
| AU | 746085 B2 | 1/2000 |
| AU | 4426799 | 1/2000 |
| AU | 750215 B2 | 4/2000 |
| AU | 754238 B2 | 4/2000 |
| AU | 755234 B2 | 4/2000 |
| AU | 5807099 | 4/2000 |
| AU | 5810599 | 4/2000 |
| AU | 5813699 | 4/2000 |
| AU | 748456 B2 | 5/2000 |
| AU | 751143 B2 | 5/2000 |
| AU | 751232 B2 | 5/2000 |
| AU | 751269 B2 | 5/2000 |
| AU | 751301 B2 | 5/2000 |
| AU | 755138 B2 | 5/2000 |

(56) References Cited

FOREIGN PATENT DOCUMENTS

| | | |
|---|---|---|
| AU | 1233800 | 5/2000 |
| AU | 1327200 | 5/2000 |
| AU | 1328200 | 5/2000 |
| AU | 1328300 | 5/2000 |
| AU | 1454700 | 5/2000 |
| AU | 1717700 | 5/2000 |
| AU | 1718600 | 5/2000 |
| AU | 2045900 | 6/2000 |
| AU | 748447 B2 | 7/2000 |
| AU | 3113800 | 7/2000 |
| AU | 2964900 | 9/2000 |
| AU | 3470800 | 9/2000 |
| AU | 4507700 | 2/2001 |
| AU | 6798300 | 4/2001 |
| AU | 1077201 | 6/2001 |
| AU | 1077301 | 6/2001 |
| AU | 8006800 | 6/2001 |
| AU | 4732501 | 10/2001 |
| AU | 5384201 | 10/2001 |
| AU | 5724801 | 11/2001 |
| AU | 756656 B2 | 1/2003 |
| AU | 2003300117 | 8/2004 |
| BR | 9913621 A | 5/2001 |
| BR | 9913622 A | 5/2001 |
| CA | 2178705 A1 | 3/1997 |
| CA | 2391428 A1 | 3/1997 |
| CA | 2259912 C | 1/1998 |
| CA | 2280002 A1 | 8/1998 |
| CA | 2289193 A1 | 12/1998 |
| CA | 2289198 A1 | 12/1998 |
| CA | 2302397 A1 | 3/1999 |
| CA | 2302488 A1 | 3/1999 |
| CA | 2302674 A1 | 3/1999 |
| CA | 2302680 A1 | 3/1999 |
| CA | 2302704 A1 | 3/1999 |
| CA | 2302678 A1 | 4/1999 |
| CA | 2308590 A1 | 5/1999 |
| CA | 2309185 A1 | 5/1999 |
| CA | 2309186 A1 | 5/1999 |
| CA | 2309183 A1 | 6/1999 |
| CA | 2320978 A1 | 8/1999 |
| CA | 2320979 A1 | 8/1999 |
| CA | 2320989 A1 | 8/1999 |
| CA | 2330608 A1 | 12/1999 |
| CA | 2334513 A1 | 12/1999 |
| CA | 2343286 A1 | 3/2000 |
| CA | 2343288 A1 | 3/2000 |
| CA | 2343756 A1 | 3/2000 |
| CA | 2347721 A1 | 5/2000 |
| CA | 2348567 A1 | 5/2000 |
| CA | 2348574 A1 | 5/2000 |
| CA | 2348575 C | 5/2000 |
| CA | 2348994 A1 | 5/2000 |
| CA | 2348999 A1 | 5/2000 |
| CA | 2350515 A1 | 5/2000 |
| CA | 2352973 A1 | 6/2000 |
| CA | 2362172 A1 | 8/2000 |
| CA | 2313596 A1 | 2/2001 |
| CN | 1282484 A | 1/2001 |
| CN | 1282485 A | 1/2001 |
| CN | 1285990 A | 2/2001 |
| CN | 1285991 A | 2/2001 |
| CN | 1293798 A | 5/2001 |
| CN | 1293858 A | 5/2001 |
| CN | 1298590 A | 6/2001 |
| CN | 1309861 A | 8/2001 |
| CN | 1310822 A | 8/2001 |
| CN | 1323418 A | 11/2001 |
| CN | 1323421 A | 11/2001 |
| CN | 1354942 A | 6/2002 |
| CN | 1130061 C | 12/2003 |
| CN | 1132399 C | 12/2003 |
| CN | 1145314 C | 4/2004 |
| CN | 1149521 C | 5/2004 |
| CN | 1152549 C | 6/2004 |
| CN | 1512724 A | 7/2004 |
| CN | 1520197 A | 8/2004 |
| CN | 1197336 C | 4/2005 |
| CN | 1200548 C | 5/2005 |
| CN | 1662025 A | 8/2005 |
| CN | 1232077 C | 12/2005 |
| CN | 1756280 A | 4/2006 |
| CN | 100477702 C | 4/2009 |
| CN | 100547568 C | 10/2009 |
| CN | 102257789 A | 11/2011 |
| CN | 101635775 B | 12/2011 |
| DE | 60011863 T2 | 12/2004 |
| DE | 69730498 T2 | 9/2005 |
| DE | 60015236 T2 | 2/2006 |
| DE | 69832275 T2 | 8/2006 |
| DE | 69833285 T2 | 9/2006 |
| DE | 69833394 T2 | 10/2006 |
| DE | 69833462 T2 | 10/2006 |
| DE | 69833935 T2 | 11/2006 |
| DE | 60214191 T2 | 12/2006 |
| DE | 69834184 T2 | 3/2007 |
| DE | 69838795 T2 | 10/2008 |
| DE | 69838814 T2 | 11/2008 |
| DE | 69839022 T2 | 1/2009 |
| DE | 69839222 T2 | 3/2009 |
| EP | 0193961 A2 | 9/1986 |
| EP | 0236013 A2 | 9/1987 |
| EP | 0376517 A2 | 7/1990 |
| EP | 0420779 A2 | 4/1991 |
| EP | 0424015 A2 | 4/1991 |
| EP | 0425161 A2 | 5/1991 |
| EP | 0425163 A2 | 5/1991 |
| EP | 0515068 A2 | 11/1992 |
| EP | 0528732 A1 | 2/1993 |
| EP | 0532972 A1 | 3/1993 |
| EP | 0539105 A2 | 4/1993 |
| EP | 0559979 A2 | 9/1993 |
| EP | 0568770 A2 | 11/1993 |
| EP | 0610625 A2 | 8/1994 |
| EP | 0647050 A2 | 4/1995 |
| EP | 0647051 A1 | 4/1995 |
| EP | 0660573 A2 | 6/1995 |
| EP | 0701358 A1 | 3/1996 |
| EP | 0705017 A2 | 4/1996 |
| EP | 0721268 A2 | 7/1996 |
| EP | 0725526 A2 | 8/1996 |
| EP | 0734187 A2 | 9/1996 |
| EP | 0740450 A2 | 10/1996 |
| EP | 0748102 A2 | 12/1996 |
| EP | 0753956 A2 | 1/1997 |
| EP | 0755146 A2 | 1/1997 |
| EP | 0758175 A1 | 2/1997 |
| EP | 0771095 A2 | 5/1997 |
| EP | 0792076 A2 | 8/1997 |
| EP | 0806858 A2 | 11/1997 |
| EP | 0817455 A2 | 1/1998 |
| EP | 0856980 A2 | 8/1998 |
| EP | 0863651 A2 | 9/1998 |
| EP | 0866407 A1 | 9/1998 |
| EP | 0869639 A2 | 10/1998 |
| EP | 0883306 A2 | 12/1998 |
| EP | 0908047 A1 | 4/1999 |
| EP | 0958560 A1 | 11/1999 |
| EP | 0962087 A1 | 12/1999 |
| EP | 1006706 A2 | 6/2000 |
| EP | 1013062 A1 | 6/2000 |
| EP | 1013066 A1 | 6/2000 |
| EP | 1016280 A1 | 7/2000 |
| EP | 1044553 A1 | 10/2000 |
| EP | 1064630 A1 | 1/2001 |
| EP | 1066712 A1 | 1/2001 |
| EP | 1075153 A2 | 2/2001 |
| EP | 1087597 A2 | 3/2001 |
| EP | 1088277 A1 | 4/2001 |
| EP | 1092313 A1 | 4/2001 |
| EP | 1107555 A2 | 6/2001 |
| EP | 1114543 A1 | 7/2001 |
| EP | 1125214 A1 | 8/2001 |
| EP | 1133677 A2 | 9/2001 |

(56) References Cited

FOREIGN PATENT DOCUMENTS

| | | |
|---|---|---|
| EP | 1133736 A1 | 9/2001 |
| EP | 1133742 A1 | 9/2001 |
| EP | 1145153 A1 | 10/2001 |
| EP | 1145154 A1 | 10/2001 |
| EP | I 163564 A2 | 12/2001 |
| EP | 1193961 A2 | 4/2002 |
| EP | 1227635 A2 | 7/2002 |
| EP | 1248447 A2 | 10/2002 |
| EP | 1290861 A1 | 3/2003 |
| EP | 1292901 A1 | 3/2003 |
| EP | 1292939 A1 | 3/2003 |
| EP | 1328121 A1 | 7/2003 |
| EP | 0873642 B1 | 4/2004 |
| EP | 1413954 A2 | 4/2004 |
| EP | 1107615 B1 | 6/2004 |
| EP | 1033024 A4 | 9/2004 |
| EP | 1129545 A1 | 9/2004 |
| EP | 1061723 B1 | 10/2004 |
| EP | 1465397 A1 | 10/2004 |
| EP | 1469663 A1 | 10/2004 |
| EP | 1484903 A2 | 12/2004 |
| EP | 1566949 A1 | 8/2005 |
| EP | 0985308 B1 | 11/2005 |
| EP | 1359735 B1 | 1/2006 |
| EP | 1357729 B1 | 2/2006 |
| EP | 1377001 B1 | 2/2006 |
| EP | 0954922 B1 | 3/2006 |
| EP | 0986875 B1 | 4/2006 |
| EP | 1410614 B1 | 8/2006 |
| EP | 1774760 A2 | 4/2007 |
| EP | 1021905 B1 | 11/2007 |
| EP | 1031232 B1 | 12/2007 |
| EP | 1865697 A3 | 12/2007 |
| EP | 1040638 B1 | 1/2008 |
| EP | 1048162 B1 | 3/2008 |
| EP | 1157509 B1 | 7/2008 |
| EP | 1337079 B1 | 9/2008 |
| EP | 1326415 B1 | 10/2008 |
| EP | 1013054 B1 | 2/2009 |
| EP | 1333653 B1 | 4/2009 |
| EP | 0983676 B1 | 6/2009 |
| EP | 1125208 B1 | 4/2010 |
| EP | 1142284 B1 | 7/2010 |
| EP | 2380323 A1 | 10/2011 |
| EP | 1408678 B1 | 11/2011 |
| EP | 1057301 B1 | 8/2013 |
| EP | 1131728 B1 | 1/2014 |
| EP | 1625460 B1 | 5/2014 |
| ES | 2231120 T3 | 5/2005 |
| ES | 2255657 T3 | 7/2006 |
| ES | 2256666 T3 | 7/2006 |
| ES | 2257639 T3 | 8/2006 |
| FR | 2671252 A1 | 7/1992 |
| GB | 2273225 A | 6/1994 |
| GB | 2306853 A | 5/1997 |
| GB | 2315190 A | 1/1998 |
| GB | 2324627 A | 10/1998 |
| GB | 2369263 A | 5/2002 |
| JP | 61-51247 | 3/1986 |
| JP | 62-200956 | 9/1987 |
| JP | 63-149955 | 6/1988 |
| JP | 64-7460 | 1/1989 |
| JP | 64-77265 | 3/1989 |
| JP | 02-170756 | 7/1990 |
| JP | 02-298154 | 12/1990 |
| JP | 03-052443 | 3/1991 |
| JP | 03-160865 | 7/1991 |
| JP | 03-177144 | 8/1991 |
| JP | 04-040723 | 2/1992 |
| JP | 4-66858 | 6/1992 |
| JP | 04-265049 | 9/1992 |
| JP | 4-336742 | 11/1992 |
| JP | 04-371056 | 12/1992 |
| JP | 06-044157 | 2/1994 |
| JP | 06-046150 | 2/1994 |
| JP | 06-066830 | 3/1994 |
| JP | 06-069988 | 3/1994 |
| JP | 06-83771 | 3/1994 |
| JP | 06-90292 | 3/1994 |
| JP | 06-103058 | 4/1994 |
| JP | 06-121051 | 4/1994 |
| JP | 06-284203 | 7/1994 |
| JP | 06-261129 | 9/1994 |
| JP | 06-291877 | 10/1994 |
| JP | 06-334748 | 12/1994 |
| JP | 07-046321 | 2/1995 |
| JP | 07-058851 | 3/1995 |
| JP | 07-115471 | 5/1995 |
| JP | 07-170288 | 7/1995 |
| JP | 07-170546 | 7/1995 |
| JP | 07-262104 | 10/1995 |
| JP | 07-212471 | 11/1995 |
| JP | 07-319538 | 12/1995 |
| JP | 07-336447 | 12/1995 |
| JP | 08-46699 | 2/1996 |
| JP | 08056377 | 2/1996 |
| JP | 08-163252 | 6/1996 |
| JP | 08-181793 | 7/1996 |
| JP | 08-504305 | 7/1996 |
| JP | 08-214076 | 8/1996 |
| JP | 08-214346 | 8/1996 |
| JP | 08-510071 | 10/1996 |
| JP | 8-321885 | 12/1996 |
| JP | 8-329118 | 12/1996 |
| JP | 8-331618 | 12/1996 |
| JP | 09-036963 | 2/1997 |
| JP | 09-501812 | 2/1997 |
| JP | 09-504394 | 4/1997 |
| JP | 09-149137 | 6/1997 |
| JP | 09-163031 | 6/1997 |
| JP | 09-224093 | 8/1997 |
| JP | 09-508508 | 8/1997 |
| JP | 09-233118 | 9/1997 |
| JP | 09-265408 | 10/1997 |
| JP | 10-11374 | 1/1998 |
| JP | 10-13811 | 1/1998 |
| JP | 10-051549 | 2/1998 |
| JP | 10-093713 | 4/1998 |
| JP | 10-093716 | 4/1998 |
| JP | 10-504425 | 4/1998 |
| JP | 10-116249 | 5/1998 |
| JP | 10-143451 | 5/1998 |
| JP | 10-506766 | 6/1998 |
| JP | 10-214113 | 8/1998 |
| JP | 10-224477 | 8/1998 |
| JP | 10-509847 | 9/1998 |
| JP | 10-304073 | 11/1998 |
| JP | 10-304074 | 11/1998 |
| JP | 10-327258 | 12/1998 |
| JP | H10-513632 | 12/1998 |
| JP | 11-055741 | 2/1999 |
| JP | H11-506292 | 6/1999 |
| JP | 11-183189 | 7/1999 |
| JP | 11-508430 | 7/1999 |
| JP | 11-508715 | 7/1999 |
| JP | 11-317817 | 11/1999 |
| JP | 11-512906 | 11/1999 |
| JP | 11-346266 | 12/1999 |
| JP | 2000-011005 | 1/2000 |
| JP | 2000-49847 | 2/2000 |
| JP | 2000-151819 | 5/2000 |
| JP | 2000-514985 | 11/2000 |
| JP | 2000-514986 | 11/2000 |
| JP | 2000-516432 | 12/2000 |
| JP | 2000-516795 | 12/2000 |
| JP | 2000-517142 | 12/2000 |
| JP | 2001-500677 | 1/2001 |
| JP | 2001-103533 | 4/2001 |
| JP | 2001-292236 | 10/2001 |
| JP | 2001-516993 | 10/2001 |
| JP | 2001-517027 | 10/2001 |
| JP | 2001-517029 | 10/2001 |
| JP | 2001-517038 | 10/2001 |
| JP | 2001-518754 | 10/2001 |

(56) References Cited

FOREIGN PATENT DOCUMENTS

| | | |
|---|---|---|
| JP | 2001-522201 | 11/2001 |
| JP | 2001-523930 | 11/2001 |
| JP | 3226929 B2 | 11/2001 |
| JP | 2001-524782 | 12/2001 |
| JP | 2001-526871 | 12/2001 |
| JP | 2002-503903 | 2/2002 |
| JP | 2002-503921 | 2/2002 |
| JP | 2002-504783 | 2/2002 |
| JP | 2002-518890 | 6/2002 |
| JP | 2002-519762 | 7/2002 |
| JP | 2002-525895 | 8/2002 |
| JP | 2002-528824 | 9/2002 |
| JP | 2002-529836 | 9/2002 |
| JP | 2002-529943 | 9/2002 |
| JP | 2002-529944 | 9/2002 |
| JP | 2002-529945 | 9/2002 |
| JP | 2002-529994 | 9/2002 |
| JP | 2002-530010 | 9/2002 |
| JP | 2002-534003 | 10/2002 |
| JP | 2002-537594 | 11/2002 |
| JP | 2003-502720 | 1/2003 |
| JP | 2003-507908 | 2/2003 |
| JP | 2003-510929 | 3/2003 |
| JP | 3384792 B2 | 3/2003 |
| JP | 3393119 B2 | 4/2003 |
| JP | 2003-516672 | 5/2003 |
| JP | 3453561 B2 | 10/2003 |
| JP | 3461488 B2 | 10/2003 |
| JP | 3516656 B2 | 4/2004 |
| JP | 3516659 B2 | 4/2004 |
| JP | 3547142 B2 | 7/2004 |
| JP | 3547397 B2 | 7/2004 |
| JP | 2004-312730 | 11/2004 |
| JP | 2005-504452 | 2/2005 |
| JP | 3615708 B2 | 2/2005 |
| JP | 3628962 B2 | 3/2005 |
| JP | 2005-094780 | 4/2005 |
| JP | 2005-102234 | 4/2005 |
| JP | 2005-124184 | 5/2005 |
| JP | 3681403 B2 | 8/2005 |
| JP | 3681406 B2 | 8/2005 |
| JP | 3686087 B2 | 8/2005 |
| JP | 3686337 B2 | 8/2005 |
| JP | 3735124 B2 | 1/2006 |
| JP | 03-820151 | 9/2006 |
| JP | 2006-295947 | 10/2006 |
| JP | 3877523 B2 | 2/2007 |
| JP | 4057785 B2 | 3/2008 |
| JP | 4205310 B2 | 1/2009 |
| JP | 4234926 B2 | 3/2009 |
| JP | 4295186 B2 | 7/2009 |
| JP | 4450515 B2 | 4/2010 |
| JP | 2012-513725 | 6/2012 |
| KR | 10-2011-0098841 A | 9/2011 |
| WO | WO9208194 A1 | 5/1992 |
| WO | WO9401959 A1 | 1/1994 |
| WO | WO9429995 A1 | 12/1994 |
| WO | WO9508236 A2 | 3/1995 |
| WO | WO9520860 A1 | 8/1995 |
| WO | WO9533325 A2 | 12/1995 |
| WO | WO9614704 A1 | 5/1996 |
| WO | WO9620553 A2 | 7/1996 |
| WO | WO9623265 A1 | 8/1996 |
| WO | WO9627254 A1 | 9/1996 |
| WO | WO9701917 A1 | 1/1997 |
| WO | WO9712472 A1 | 4/1997 |
| WO | WO9713352 A1 | 4/1997 |
| WO | WO9716014 A2 | 5/1997 |
| WO | WO9718662 A1 | 5/1997 |
| WO | WO9720424 A1 | 6/1997 |
| WO | WO9722201 A2 | 6/1997 |
| WO | WO9723078 A1 | 6/1997 |
| WO | WO9726749 A1 | 7/1997 |
| WO | WO9728635 A1 | 8/1997 |
| WO | WO9729584 A1 | 8/1997 |
| WO | WO9734401 A1 | 9/1997 |
| WO | WO9736414 A1 | 10/1997 |
| WO | WO9737500 A1 | 10/1997 |
| WO | WO9738389 A2 | 10/1997 |
| WO | WO9738519 A1 | 10/1997 |
| WO | WO9750235 A1 | 12/1997 |
| WO | WO9801987 A1 | 1/1998 |
| WO | WO9810573 A2 | 3/1998 |
| WO | WO9813765 A1 | 4/1998 |
| WO | WO9813974 A1 | 4/1998 |
| WO | WO9817048 A1 | 4/1998 |
| WO | WO9827479 A2 | 6/1998 |
| WO | WO9831130 A1 | 7/1998 |
| WO | WO9834390 A1 | 8/1998 |
| WO | WO9835326 A1 | 8/1998 |
| WO | WO9835509 A2 | 8/1998 |
| WO | WO9836551 A1 | 8/1998 |
| WO | WO9837481 A1 | 8/1998 |
| WO | WO9837677 A2 | 8/1998 |
| WO | WO9837686 A1 | 8/1998 |
| WO | WO9837687 A1 | 8/1998 |
| WO | WO9844699 A1 | 10/1998 |
| WO | WO9844714 A1 | 10/1998 |
| WO | WO9848577 A2 | 10/1998 |
| WO | WO9854877 A2 | 12/1998 |
| WO | WO9856133 A2 | 12/1998 |
| WO | WO9856141 A1 | 12/1998 |
| WO | WO9857501 A2 | 12/1998 |
| WO | WO9900960 A1 | 1/1999 |
| WO | WO9900966 A1 | 1/1999 |
| WO | WO9903247 A2 | 1/1999 |
| WO | WO9912367 A1 | 3/1999 |
| WO | WO9913635 A1 | 3/1999 |
| WO | WO9914919 A1 | 3/1999 |
| WO | WO9914920 A1 | 3/1999 |
| WO | WO9914924 A1 | 3/1999 |
| WO | WO9914951 A1 | 3/1999 |
| WO | WO9917518 A1 | 4/1999 |
| WO | WO9923806 A1 | 5/1999 |
| WO | WO9923807 A1 | 5/1999 |
| WO | WO9926395 A1 | 5/1999 |
| WO | WO9926424 A2 | 5/1999 |
| WO | WO9927698 A1 | 6/1999 |
| WO | WO9941720 A1 | 8/1999 |
| WO | WO9941890 A2 | 8/1999 |
| WO | WO9941891 A1 | 8/1999 |
| WO | WO9941895 A1 | 8/1999 |
| WO | WO9943137 A1 | 8/1999 |
| WO | WO9925117 | 10/1999 |
| WO | WO9956227 A1 | 11/1999 |
| WO | WO9956229 A1 | 11/1999 |
| WO | WO9965214 A1 | 12/1999 |
| WO | WO9965252 A2 | 12/1999 |
| WO | WO9967718 A1 | 12/1999 |
| WO | WO0007332 A2 | 2/2000 |
| WO | WO 00/16523 | 3/2000 |
| WO | WO0016203 A1 | 3/2000 |
| WO | WO0016207 A1 | 3/2000 |
| WO | WO0018094 A1 | 3/2000 |
| WO | WO0025238 A1 | 5/2000 |
| WO | WO0026804 A1 | 5/2000 |
| WO | WO0026816 A1 | 5/2000 |
| WO | WO0026817 A1 | 5/2000 |
| WO | WO0027063 A2 | 5/2000 |
| WO | WO0028425 A1 | 5/2000 |
| WO | WO0028702 A1 | 5/2000 |
| WO | WO0035173 A1 | 6/2000 |
| WO | WO0038398 A1 | 6/2000 |
| WO | WO0044159 A1 | 7/2000 |
| WO | WO0049482 A2 | 8/2000 |
| WO | WO0049778 A1 | 8/2000 |
| WO | WO0113606 A1 | 2/2001 |
| WO | WO0124025 A1 | 4/2001 |
| WO | WO0140997 A1 | 6/2001 |
| WO | WO0141372 A1 | 6/2001 |
| WO | WO0143410 A1 | 6/2001 |
| WO | WO0152513 A1 | 7/2001 |
| WO | WO0180214 A1 | 10/2001 |
| WO | WO0180540 A1 | 10/2001 |

(56) References Cited

FOREIGN PATENT DOCUMENTS

| WO | WO0184360 A1 | 11/2001 |
|---|---|---|
| WO | WO 02/065741 A2 | 8/2002 |
| WO | WO03010948 A1 | 2/2003 |
| WO | WO2004063854 A2 | 7/2004 |
| WO | WO2005036907 A1 | 4/2005 |
| WO | WO2006055059 A2 | 5/2006 |
| WO | WO2010075151 A1 | 7/2010 |

OTHER PUBLICATIONS

SIPO Office Action, with English Translation, dated Jul. 1, 2013, for Chinese Application No. 200980151937.6, 14 pages.
English Translation of Final Notice of Preliminary Rejection, dated Jun. 13, 2013, for Korean Patent Application No. 10-2011-7016735, 3 pages.
Office Action mailed Jan. 24, 2013 (with English translation), issued in Japanese Patent Application No. 2011-543586, 5 pages.
"Competitive Gateway Product," Nikkei Communications, Japan, No. 257, Nov. 1997, 18 pages.
"Guide for the Use of Micro-Researcher II/SGR (Scroll Graph Section)," NEC Corporation, Third Edition, Chapters 1 & 5, Jul. 1995, 2 pages.
"Kana: Customer Messaging System," Kana Communications Sales Brochure, Palo Alto, CA, 1996, 12 pages.
"Latest Trend in CTI," Nikkei Communications, No. 248, Jun. 16, 1997, 14 pages.
"Method for Automatic Contextual Transposition Upon Receipt of Item of Specified Criteria," IBM Technical Disclosure Bulletin, vol. 37, No. 2B, Feb. 1994, 1 page.
"New Telephone Service Changing Computer Telephone Business," Nikkei Communications, Nov. 11, 1996, 7 pages.
"Single Line Suffices for Internet Telephone," Nikkei Communications, May 19, 1997, 9 pages.
"Solution Drivers/CTI, CTI Solution Strategy of Seven Computer Vendors, Toward Market Development of Mainly Bank, Insurance and Communications Markets," Computopia, Computer Age Co., Ltd., Japan, vol. 33, No. 379, 5 pages, Apr. 1998.
Bachmann, David W. et al., "NetMod: A Design Tool for Large-Scale Heterogeneous Campus Networks," Center for Information Technology Integration (CITI), The University of Michigan, Ann Arbor, MI, Jun. 15, 1990, 34 pages.
Bangun, H. et al., A Network Architecture for Multiuser Networked Games on Demand, International Conference on Information Communications and Signal Processing, ICICS '97, Sep. 9-12, 1997, 5 pages.
Beck, C. et al., Interactive process of operating system for multimedia communication center, Genesys Telecom Lab, Inc. 2014, 3 pages.
Bernett, Howard et al., "Assessing Web-Enabled Call Center Technologies," IT Pro, May/Jun. 2001, 7 pages.
Bertsekas, Dimitri et al., "Data Networks," Prentice-Hall, New Jersey, 1987, 5 pages.
Bickley, M. et al., Using Servers to Enhance Control System Capability, 1999 Particle Accelerator Conference, New York, NY, Mar. 29-Apr. 2, 1999, 3 pages.
Bradley, Kirk A. et al., "Detecting Disruptive Routers: A Distributed Network Monitoring Approach," Department of Computer Science, University of California, Davis, Sep. 1, 1998, 10 pages.
Canadian Office Action for Application No. 2,259,912, dated Nov. 19, 2011, 2 pages.
Canadian Office Action for Application No. 2,289,198, dated Jun. 28, 2002, 2 pages.
Canadian Office Action for Application No. 2,302,397, dated Apr. 23, 2002, 2 pages.
Canadian Office Action for Application No. 2,302,678, dated Apr. 23, 2002, 2 pp.ages
Canadian Office Action for Application No. 2308590, dated Jun. 28, 2002, 2 pages.
Canadian Office Action for Application No. 2309183, dated Jul. 23, 2002, 2 pages.
Canadian Office Action for Application No. 2320978, dated Jun. 2, 2003, 2 pages.
Canadian Office Action for Application No. 2320978, dated Sep. 26, 2002, 2 pages.
Canadian Office Action for Application No. 2334513, dated May 30, 2003, 2 pages.
Canadian Office Action for Application No. 2347721, dated Aug. 12, 2004, 3 pages.
Canadian Office Action for Application No. 2352973, dated Apr. 17, 2003, 3 pages.
Chan, Kevin F. et al., "Interactive Network Planning and Analysis on a Personal Computer," Computer Applications in Power, IEEE, vol. 3, No. 1, Jan. 1990, 5 pages.
Chau, Sam et al., "Intelligent Network Routing Using CCS7 and ISDN," Global Telecommunications Conference, vol. 3, 6 pages, 1990.
Chaudhuri, Surajit et al., "Optimizing Queries over Multimedia Repositories," Hewlett-Packard Laboratories, Stanford, Mar. 1996, 12 pages.
Chaum, David, "Untraceable Electronic Mail, Return Addresses, and Digital Pseudonyms," Communications of the ACM, vol. 24, No. 2, Feb. 1981, 8 pages.
Chew, T.-S. et al., "Netplan-a Telecommunications Network Planning Support System," TENCON '92, IEEE Region 10 International Conference, vol. 2, 7 pages, 1992.
Chinese Office Action for Application No. 98812258.8 dated Jul. 26, 2002, 5 pages.
Chinese Office Action for Application No. 98812259.6, dated Jan. 10, 2003, 9 pages.
Chinese Office Action for Application No. 98812261.8, dated Jun. 20, 2003, 10 pages.
Chinese Office Action for Application No. 99808531.6, dated Mar. 14, 2003, 14 pages.
Chinese Office Action for Application No. 99811995.4, dated Apr. 8, 2005, 6 pages.
Chinese Office Action for Application No. 99811995.4, dated Jul. 6, 2007, 11 pages.
Chinese Office Action for Application No. 99811996.2, dated May 9, 2003, 10 pages.
Chinese Office action with English Translation for Application No. 200980151937.6 dated May 23, 2014, 7 pages.
Chiu, H. et al., "Conferencing Metaphor," IBM Technical Disclosure Bulletin, vol. 36, No. 2, Feb. 1993, 4 pages.
Chou, Sheng-Lin., et al., "Computer Telephony Integration and Its Applications," IEEE Communications Surveys & Tutorials, vol. 3, No. 1, 2000, 10 pages.
Cordom, Christopher et al., "Conversant VIS Listens and Talks to Your Customers," AT&T Technology, vol. 9, No. 2, 4 pages, 1994.
Curbera, Francisco et al., "Unraveling the Web Services Web: An Introduction to SOAP, WSDL, and UDDI," IEEE Internet Computing, 8 pages, Mar./Apr. 2002.
D'Hooge, Herman, "The Communicating PC," IEEE Communications Magazine, 6 pages, Apr. 1996.
Durinovic-Johri, Sanja et al., "Advanced Routing Solutions for Toll-Free Customers: Algorithm Design and Performance," Proceedings of the International Teletraffic Congress, ITC-15, 1997, 12 pages.
Eren, P. Erhan, et al., "Interactive Object-Based Analysis and Manipulation of Digital Video," IEEE Workshop on Multimedia Signal Processing, 1998, 6 pages.
Esesve, D.R., "Wireless Application Protocol (WAP)," Vitam College of Engineering, No Date Available, 12 pages.
European Office action Application No. 04011886.1, dated Mar. 9, 2007, 6 pages.
European Office action for Application No. 00115441.8, dated Feb. 11, 2004, 7 pages.
European Office action for Application No. 00115441.8, dated Mar. 15, 2005, 4 pages.
European Office Action for Application No. 00115441.8, dated May 18, 2006, 11 pages.
European Office Action for Application No. 00119160.0, dated Jan. 16, 2004, 6 pages.
European Office action for Application No. 00123329.5, dated Jun. 17, 2002, 6 pages.

(56) References Cited

OTHER PUBLICATIONS

European Office Action for Application No. 00123331.1, dated Apr. 18, 2006, 5 pages.
European Office Action for Application No. 00305049.9, dated Dec. 29, 2003, 5 pages.
European Office Action for Application No. 00908266.0, dated Aug. 10, 2005, 6 pages.
European Office action for Application No. 02400027.5, dated Jan. 21, 2008, 5 pages.
European Office action for Application No. 02756535.7, dated Aug. 5, 2005, 6 pages.
European Office Action for Application No. 03022831.6, dated Nov. 30, 2006, 7 pages.
European Office Action for Application No. 03800376.0, dated Jul. 8, 2008, 6 pages.
European Office Action for Application No. 04009176.1, dated Oct. 12, 2011, 8 pages.
European Office Action for Application No. 97904087.0, dated Jun. 25, 2002, 5 pages.
European Office Action for Application No. 97933327.5, dated Aug. 26, 2002, 4 pages.
European Office Action for Application No. 97933327.5, dated Feb. 7, 2002, 5 pages.
European Office Action for Application No. 98903471.5, dated May 29, 2006, 4 pages.
European Office Action for Application No. 98903471.5, dated Oct. 11, 2004, 6 pages.
European Office Action for Application No. 98908545.1, dated Mar. 15, 2005, 4 pages.
European Office Action for Application No. 98908545.1, dated Nov. 14, 2003, 10 pages.
European Office Action for Application No. 98924821.6, dated Aug. 26, 2003, 4 pages.
European Office Action for Application No. 98926248.0, dated Aug. 5, 2004, 4 pages.
European Office Action for Application No. 98926248.0, dated Dec. 11, 2003, 4 pages.
European Office Action for Application No. 98926248.0, dated Oct. 21, 2002, 6 pages.
European Office Action for Application No. 98944799.0, dated Aug. 18, 2005, 7 pages.
European Office Action for Application No. 98944799.0, dated Mar. 26, 2008, 5 pages.
European Office Action for Application No. 98944830.3, dated Jan. 30, 2006, 9 pages.
European Office Action for Application No. 98946907.7, dated Jun. 1, 2006, 6 pages.
European Office Action for Application No. 98946926.7, dated Dec. 8, 2005, 4 pages.
European Office Action for Application No. 98953947.3, dated Aug. 22, 2006, 6 pages.
European Office Action for Application No. 98953962.2, dated Oct. 28, 2005, 5 pages.
European Office Action for Application No. 98956309.3, dated Jun. 8, 2005, 5 pages.
European Office Action for Application No. 99905907.4, dated Oct. 31, 2005, 4 pages.
European Office Action for Application No. 99906856.2, dated Sep. 24, 2007, 5 pages.
European Office Action for Application No. 99906958.6, dated Feb. 22, 2006, 7 pages.
European Office Action for Application No. 99927333.7, dated Aug. 21, 2006, 9 pages.
European Office Action for Application No. 99927340.2, dated Aug. 9, 2011, 6 pages.
European Office Action for Application No. 99927340.2, dated Nov. 25, 2013, 5 pages.
European Office Action for Application No. 99945479.6, dated Aug. 9, 2006, 6 pages.
European Office Action for Application No. 99945519.9, dated Aug. 20, 2007, 6 pages.
European Office action for Application No. 99956732.4, dated Aug. 17, 2006, 7 pages.
European Office action for Application No. 99956745.6, dated Mar. 14, 2006, 5 pages.
European Office Action for Application No. 99960267.5, dated May 10, 2007, 6 pages.
European Office Action for Application No. 99960279.0, dated Aug. 16, 2005, 6 pages.
European Office Action for Application No. 99965163.1, dated Jul. 13, 2009, 5 pages.
European Search Report and Written Opinion for Application No. 05783002.8, dated Mar. 16, 2009, 8 pages.
European Search Report for 0115441.8 (now EP1075153), dated Nov. 6, 2002, 3 pages.
European Search Report for Application No. 00123329.5, dated Jan. 30, 2002, 2 pages.
European Search Report for Application No. 00123331.1, dated Dec. 5, 2003, 6 pages.
European Search Report for Application No. 00305049.9, dated May 7, 2003, 3 pages.
European Search Report for Application No. 00908266.0, dated May 24, 2005, 3 pages.
European Search Report for Application No. 00913226.7, dated Feb. 14, 2005, 3 pages.
European Search Report for Application No. 0119160.0, dated Apr. 17, 2003, 3 pages.
European Search Report for Application No. 01920248.0, dated May 3, 2004, 3 pages.
European Search Report for Application No. 01927387.9, dated Jun. 2, 2006, 3 pages.
European Search Report for Application No. 02400027.5, dated Feb. 20, 2004, 3 pages.
European Search Report for Application No. 02756535.7, dated May 25, 2005, 4 pages.
European Search Report for Application No. 03002575.3, dated Jun. 4, 2003, 3 pages.
European Search Report for Application No. 03008532.8, dated Dec. 27, 2004, 3 pages.
European Search Report for Application No. 03008534.4, dated Jul. 23, 2003, 3 pages.
European Search Report for Application No. 03022831.6, dated Mar. 22, 2006, 3 pages.
European Search Report for Application No. 03023463.7, dated Jun. 14, 2004, 3 pages.
European Search Report for Application No. 03076826.1, dated Sep. 10, 2003, 3 pages.
European Search Report for Application No. 03077174.5, dated Sep. 4, 2003, 4 pages.
European Search Report for Application No. 03077712.2, dated Mar. 29, 2004, 3 pages.
European Search Report for Application No. 03800376, dated May 7, 2007, 3 pages.
European Search Report for Application No. 04007911.3, dated Aug. 17, 2004, 5 pages.
European Search Report for Application No. 04007913.9, dated Aug. 5, 2004, 4 pages.
European Search Report for Application No. 04011886.1, dated Jun. 22, 2006, 5 pages.
European Search Report for Application No. 07018035.1, dated Apr. 23, 2009, 4 pages.
European Search Report for Application No. 97904087.0, dated Nov. 5, 2001, 3 pages.
European Search Report for Application No. 97933327.5, dated Oct. 11, 2001, 3 pages.
European Search Report for Application No. 98903471.5, dated Jul. 26, 2002, 4 pages.
European Search Report for Application No. 98903623.1, dated Apr. 17, 2002, 3 pages.
European Search Report for Application No. 98907371.3, dated Mar. 28, 2002, 3 pages.

(56) References Cited

OTHER PUBLICATIONS

European Search Report for Application No. 98924821.6, dated Jun. 13, 2002, 2 pages.
European Search Report for Application No. 98926248, dated Jul. 18, 2002, 3 pages.
European Search Report for Application No. 98944799.0, dated Aug. 5, 2004, 3 pages.
European Search Report for Application No. 98944830.3, dated Aug. 11, 2004, 3 pages.
European Search Report for Application No. 98946907.7, dated Aug. 11, 2004, 3 pages.
European Search Report for Application No. 98946926.7, dated Aug. 11, 2004, 3 pages.
European Search Report for Application No. 98948163.5, dated Aug. 8, 2000, 3 pages.
European Search Report for Application No. 98948164.3, dated Jun. 15, 2004, 3 pages.
European Search Report for Application No. 98953947.3, dated Aug. 20, 2004, 3 pages.
European Search Report for Application No. 98953962.2, dated Sep. 2, 2004, 3 pages.
European Search Report for Application No. 98956187.3, dated Sep. 16, 2005, 3 pages.
European Search Report for Application No. 98956309.3, dated Sep. 10, 2004, 3 pages.
European Search Report for Application No. 99905907.4, dated Jun. 1, 2005, 3 pages.
European Search Report for Application No. 99906856.2, dated Oct. 4, 2006, 3 pages.
European Search Report for Application No. 99906958.6, dated Aug. 19, 2005, 3 pages.
European Search Report for Application No. 99927333.7, dated Mar. 30, 2005, 5 pages.
European Search Report for Application No. 99927340.2, dated Oct. 18, 2004, 3 pages.
European Search Report for Application No. 99945479.6, dated Mar. 24, 2006, 3 pages.
European Search Report for Application No. 99945519.9, dated Oct. 18, 2005, 3 pages.
European Search Report for Application No. 99945556.1, dated Nov. 16, 2004, 3 pages.
European Search Report for Application No. 99956732.4, dated Apr. 19, 2006, 4 pages.
European Search Report for Application No. 99956745.6, dated Jun. 30, 2005, 3 pages.
European Search Report for Application No. 99960267.5, dated Jul. 14, 2005, 3 pages.
European Search Report for Application No. 99960279.0, dated Apr. 26, 2005, 3 pages.
European Search Report for Application No. 99965163.1, dated Nov. 19, 2004, 4 pages.
European Search Report for Application No. 99971602.0, dated Feb. 6, 2007, 3 pages.
Festa, Paul, "Vignette Updates StoryServer Platform," CNET News.com, Sep. 16, 1997, 4 pages.
Foster, Robin Harris, "Advanced Definity Call Centers: Working for You and Your Customers," AT&T Technology, vol. 9, No. 2, 1994, 6 pages.
Francis, Paul et al., "Flexible Routing and Addressing for a Next Generation IP," SIGCOMM, 10 pages, 1994.
Gawrys, G.W., et al., "ISDN: Integrated Network/Premises Solutions for Customer Needs," ICC, 6 pages, 1986.
Gechter, J. et al., "ISDN Service Opportunities in the Intelligent Network," Proceedings of the National Communications Forum, Chicago, IL, vol. 43, No. 1, Oct., 1989, 4 pages.
Harvey, Dean E. et al., "Call Center Solutions," AT&T Technical Journal, vol. 70, No. 5, 10 pages, Sep./Oct. 1991.
Held, Gilbert, "Voice Over Data Networks," McGraw Hill, Texas, 1998, 16 pages.
Henderson, Shane G. et al., "Rostering by Interating Integer Programming and Simulation," Proceedings of the 1998 Winter Simulation Conference, Washington D.C., Dec. 13, 1998, 7 pages.
Hofmann, Peter. et al., "@INGate: Integrating Telephony and Internet," IEEE Conference on Protocols for Multimedia Systems, 4 pages, Nov. 1997.
House, Eric, "How to Munge Outgoing From: Field When Using Mail?," Google Discussion Group, Apr. 2, 1997, 1 page.
Hu, Michael Junke et al., "An Object-Relational Database System for the Interactive Multimedia," IEEE International Conference on Intelligent Processing Systems, pp. 1571-1575, Oct. 1997.
International Preliminary Examination Report for PCT/US01/13313, dated Apr. 22, 2002, 4 pages.
International Preliminary Examination Report for PCT/US01/40267, dated Dec. 9, 2002, 4 pages.
International Preliminary Examination Report for PCT/US96/16919, dated Feb. 18, 1998, 18 pages.
International Preliminary Examination Report for PCT/US97/01469, dated Oct. 14, 1998, 8 pages.
International Preliminary Examination Report for PCT/US97/11881, dated Mar. 27, 1998, 3 pages.
International Preliminary Examination Report for PCT/US98/00631, dated Sep. 10, 1999, 7 pages.
International Preliminary Examination Report for PCT/US98/02847, dated Jul. 9, 1999, 5 pages.
International Preliminary Examination Report for PCT/US98/13644, dated Jan. 12, 2000, 6 pages.
International Preliminary Examination Report for PCT/US98/18646, dated Oct. 30, 2000, 5 pages
International Preliminary Examination Report for PCT/US98/18789, dated Dec. 30, 1999, 6 pages.
International Preliminary Examination Report for PCT/US98/22527, dated Jun. 30, 2000, 5 pages.
International Preliminary Examination Report for PCT/US99/12841, dated Jan. 22, 2001, 5 pages.
International Preliminary Examination Report for PCT/US99/25308, dated Sep. 10, 2000, 3 pages.
International Preliminary Examination Report for PCT/US99/25309, dated May 8, 2001, 4 pages.
International Preliminary Report on Patentability for PCT/US2005/027544, dated May 22, 2007, 7 pages.
International Search Report and Written Opinion for PCT/US2009/068402, dated Mar. 31, 2010, 10 pages.
International Search Report for PCT/US00/00781, dated Apr. 12, 2000, 2 pages.
International Search Report for PCT/US00/00785, dated Oct. 2, 2000, 2 pages.
International Search Report for PCT/US00/023066, dated Oct. 30, 2000, 1 page.
International Search Report for PCT/US00/27982, dated Jan. 31, 2001, 3 pages.
International Search Report for PCT/US00/27983, dated Mar. 19, 2001, 2 pages.
International Search Report for PCT/US00/27984, dated Mar. 22, 2001, 1 page.
International Search Report for PCT/US01/07457, dated Aug. 30, 2001, 1 page.
International Search Report for PCT/US01/13313, dated Jul. 6, 2001, 1 page.
International Search Report for PCT/US01/40267, dated Jul. 17, 2001, 1 page.
International Search Report for PCT/US02/23080, dated Oct. 1, 2002, 1 page.
International Search Report for PCT/US03/41677, dated Apr. 10, 2006, 1 page.
International Search Report for PCT/US05/27544, dated Jun. 14, 2006, 1 page.
International Search Report for PCT/US96/16919, dated Jun. 2, 1997, 3 pages.
International Search Report for PCT/US97/01469, dated Apr. 14, 1997, 1 page.
International Search Report for PCT/US97/05457, dated Jun. 24, 1997, 2 pages.

(56) References Cited

OTHER PUBLICATIONS

International Search Report for PCT/US97/11881, dated Oct. 24, 1997, 1 page.
International Search Report for PCT/US98/00631, dated Jun. 18, 1998, 1 page.
International Search Report for PCT/US98/01158, dated Jul. 17, 1998, 1 page.
International Search Report for PCT/US98/02152, dated Jun. 25, 1998, 1 page.
International Search Report for PCT/US98/02847, dated Aug. 6, 1998, 1 page.
International Search Report for PCT/US98/02848, dated Aug. 11, 1998, 1 page.
International Search Report for PCT/US98/02923, dated Aug. 19, 1998, 1 page.
International Search Report for PCT/US98/06334, dated Sep. 1, 1998, 2 pages.
International Search Report for PCT/US98/10357, dated Jan. 14, 1999, 1 page.
International Search Report for PCT/US98/11442, dated Oct. 21, 1998, 2 pages.
International Search Report for PCT/US98/13644, dated Apr. 21, 1999, 2 pages.
International Search Report for PCT/US98/18646, dated Jan. 29, 1999, 2 pages.
International Search Report for PCT/US98/18789, dated Jan. 29, 1999, 3 pages.
International Search Report for PCT/US98/18833, dated Nov. 19, 1998, 1 page.
International Search Report for PCT/US98/18874, dated Jan. 29, 1999, 1 page.
International Search Report for PCT/US98/18989, dated Jan. 25, 1999, 1 page.
International Search Report for PCT/US98/22527, dated Apr. 2, 1999, 2 pages.
International Search Report for PCT/US98/22555, mailed Mar. 3, 1999, 1 page.
International Search Report for PCT/US98/22600, mailed Jun. 4, 1999, 1 page.
International Search Report for PCT/US98/22935, mailed Apr. 14, 1999, 1 page.
International Search Report for PCT/US99/02812, mailed May 11, 1999, 1 page.
International Search Report for PCT/US99/02814, mailed Jun. 17, 1999, 1 page.
International Search Report for PCT/US99/02822, mailed Aug. 18, 1999, 1 page.
International Search Report for PCT/US99/03038, mailed Apr. 23, 1999, 1 page.
International Search Report for PCT/US99/03039, mailed May 11, 1999, 1 page.
International Search Report for PCT/US99/12700, mailed Nov. 30, 1999, 1 page.
International Search Report for PCT/US99/12781, mailed Sep. 9, 1999, 2 pages.
International Search Report for PCT/US99/12841, mailed Sep. 10, 1999, 2 pages.
International Search Report for PCT/US99/20259, dated Feb. 15, 2000, 1 page.
International Search Report for PCT/US99/20387, dated Dec. 7, 1999, 2 pages.
International Search Report for PCT/US99/20461, dated Dec. 23, 1999, 2 pages.
International Search Report for PCT/US99/25117, dated Nov. 1, 2000, 2 pages.
International Search Report for PCT/US99/25265, dated Feb. 18, 2000, 1 page.
International Search Report for PCT/US99/25308, dated Feb. 3, 2000, 1 page.
International Search Report for PCT/US99/25309, dated Feb. 10, 2000, 1 page.
International Search Report for PCT/US99/25310, dated Feb. 10, 2000, 1 page.
International Search Report for PCT/US99/26619, dated Mar. 17, 2000, 1 page.
International Search Report for PCT/US99/26659, dated Feb. 4, 2000, 1 page.
International Search Report for PCT/US99/29043, dated Mar. 20, 2000, 1 page.
International Search Report for PCT/US99/29044, dated May 11, 2000, 1 page.
International Written Opinion for PCT/US98/22527, mailed Dec. 27, 1999, 5 pages.
Japanese Interrogation and Re-Examination Report for Application No. 1999-502827, mailed Oct. 26, 2004, 7 pages.
Japanese Office Action for Application No. 1997-527811, mailed Oct. 10, 2000, 6 pages.
Japanese Office Action for Application No. 1998-505335, mailed Mar. 5, 2002, 7 pages.
Japanese Office Action for Application No. 1998-531244, mailed Jan. 6, 2004, 4 pages.
Japanese Office Action for Application No. 1998-531244, mailed Sep. 10, 2002, 5 pages.
Japanese Office Action for Application No. 1998-536740, mailed Feb. 24, 2004, 5 pages.
Japanese Office Action for Application No. 1998-536740, mailed Sep. 3, 2002, 14 pages.
Japanese Office Action for Application No. 1999-500765, mailed Feb. 10, 2004, 6 pages.
Japanese Office Action for Application No,. 1999-500765, mailed Sep. 3, 2002, 11 pages.
Japanese Office Action for Application No. 1999-502827, mailed Dec. 3, 2002, 4 pages.
Japanese Office Action for Application No. 1999-502827, mailed May 28, 2002, 3 pages.
Japanese Office Action for Application No. 1999-502827, mailed Nov. 1, 2005, 8 pages.
Japanese Office action for Application No. 2000-220082, mailed on Apr. 1, 2003, 3 pages.
Japanese Office Action for Application No. 2000-511299, mailed Feb. 3, 2004, 4 pages.
Japanese Office Action for Application No. 2000-511299, mailed May 16, 2006, 7 pages.
Japanese Office Action for Application No. 2000-512333, mailed Sep. 3, 2002, 6 pages.
Japanese Office Action for Application No. 2000-512334, mailed Sep. 10, 2002, 9 pages.
Japanese Office Action for Application No. 2000-512336, mailed Jul. 23, 2002, 8 pages.
Japanese Office Action for Application No. 2000-512336, mailed Jun. 24, 2003, 4 pages.
Japanese Office Action for Application No. 2000-514448, mailed Sep. 3, 2002, 10 pages.
Japanese Office Action for Application No. 2000-519541, dated May 16, 2005, 4 pages.
Japanese Office Action for Application No. 2000-519541, mailed Aug. 20, 2002, 10 pages.
Japanese Office Action for Application No. 2000-519541, mailed Dec. 2, 2003, 7 pages.
Japanese Office Action for Application No. 2000-519541, mailed Mar. 14, 2006, 6 pages.
Japanese Office Action for Application No. 2000-522718, mailed Sep. 10, 2002, 9 pages.
Japanese Office Action for Application No, 2000-531822, mailed Sep. 24, 2002, 6 pages.
Japanese Office Action for Application No. 2000-531940, mailed Dec. 3, 2002, 4 pages.
Japanese Office Action for Application No. 2000-532958, mailed Aug. 20, 2002, 7 pages.
Japanese Office Action for Application No. 2000-554115, dated Apr. 27, 2005, 5 pages.

(56) References Cited

OTHER PUBLICATIONS

Japanese Office Action for Application No. 2000-554115, mailed Jan. 6, 2004, 4 pages.
Japanese Office Action for Application No. 2000-554115, mailed Oct. 1, 2002, 5 pages.
Japanese Office Action for Application No. 2000-556311, mailed Oct. 21, 2003, 6 pages.
Japanese Office Action for Application No. 2000-570673, dated Oct. 4, 2005, 4 pages.
Japanese Office Action for Application No. 2000-570673, mailed Mar. 8, 2005, 6 pages.
Japanese Office Action for Application No. 2000-570673, mailed Oct. 14, 2003, 6 pages.
Japanese Office Action for Application No. 2000-570677, mailed May 11, 2004, 8 pages.
Japanese Office Action for Application No. 2000-570677, mailed Nov. 30, 2004, 10 pages.
Japanese Office Action for Application No. 2000-570941, mailed Oct. 7, 2003, 6 pages.
Japanese Office Action for Application No, 2000-578753, mailed May 11, 2004, 11 pages.
Japanese Office Action for Application No. 2000-580124, mailed Apr. 12, 2005, 6 pages.
Japanese Office Action for Application No. 2000-580124, mailed Oct. 7, 2003, 5 pages.
Japanese Office Action for Application No. 2000-580329, mailed Feb. 15, 2005, 8 pages.
Japanese Office Action for Application No. 2000-580329, mailed May 13, 2008, 8 pages.
Japanese Office Action for Application No. 2000-580329, mailed Oct. 4, 2005, 5 pages.
Japanese Office Action for Application No. 2000-581781, mailed Feb. 3, 2004, 4 pages.
Japanese Office Action for Application No. 2000-581781, mailed Oct. 8, 2002, 4 pages.
Japanese Office Action for Application No. 2000-590363, mailed Apr. 1, 2003, 6 pages.
Japanese Office Action for Application No. 2001-526724, mailed Aug. 1, 2006, 5 pages.
Japanese Office Action for Application No. 2001-526724, mailed Dec. 13, 2005, 5 pages.
Japanese Office Action for Application No. 2001-526724, mailed May 17, 2005, 4 pages.
Japanese Office Action for Application No. 2006-127262, mailed Jun. 1, 2010 (5 pages).
Japanese Office Action for Application No. 2006-127262, mailed Nov. 18, 2008 (7 pages).
Japanese Office Action for Application No. 532950, dated Dec. 17, 2002, 6 pages.
Katz, Michael, "When CTI Meets the Internet," Telecommunications, vol. 31, No. 7, Jul. 1997, 6 pages.
Kaufman, Harvey, "Call Centers in Cyberspace," Communications News, vol. 34, Issue 7, Jul. 1997, 4 pages.
Kaukonen, S., et al., "Agent-Based Conferencing Using Mobile IP-Telephony," Proceedings of Multimedia Signal Processing, 1999, 6 pages.
Korean Office Action for Application No. 10-2011-7017067, dated Aug. 21, 2012, 9 pages.
Kramer, Brian, "How to Send a File to the Sender of a Message?," Google Discussion Group, May 27, 1994, 5 pages.
Lee, Chien-I, et al., "A New Storage and Retrieval Method to Support Editing Operations in a Multi-Disk-based Video Server," Fourth International Conference on Parallel and Distributed Information Systems, IEEE, Miami Beach, FL, Dec. 1996, 10 pages.
Lin, Yi-Bing et al., "A Flexible Graphical User Interface for Performance Modeling," Software—Practice and Experience, vol. 25(2), Feb. 1995, 24 pages.
Low, Colin, "The Internet Telephony Red Herring," Global Telecommunications Conference, Nov. 1996, 15 pages.
Mackay, Wendy E., et al., "Virtual Video Editing in Interactive Multimedia Applications," Communications of the ACM, vol. 32, No. 7, Jul. 1989, 9 pages.
Malabocchia, Fabio, et al., "Mining Telecommunications Data Bases: An Approach to Support the Business Management," Network Operations and Management Symposium, IEEE, vol. 1, Feb. 1998, 9 pages.
Masashi, Tsuboi et al., "Computer Telephony Integration System," CTSTAGE, Oki Electric Research and Development, 174, vol. 64, No. 2, Apr. 1, 1997, 10 pages.
Matsumoto, Akihiko, "Bank CTI/Call Center Using Up Customer Information, Analysis of Six Major Manufacturers' Solutions," Network Computing, Ric Telecom Corporation, Japan, vol. 10, No. 10, Oct. 1, 1998, 13 pages.
Matsuo, Yasunori, "Microsoft Project for Windows 95," Nikkei Personal Computing, Nikkei Business Publications, Inc., No. 255, Dec. 18, 1995, 2 pages.
Mattison, Rob, "Data Warehousing and Data Mining for Telecommunications," Artech House, Boston, 1997, 7 pages.
Metz, Christopher, "IP Routers: New Tool for Gigabit Networking," On the Wire, IEEE Internet, Nov./Dec. 1998, 5 pages.
Microsoft Dictionary Pages, Microsoft Press, Redmond, WA, 1991, 2 pages.
Monson-Haefel, Richard, "Enterprise JavaBeans," O'Reilly & Assoc., 2nd Ed., 1999, 7 pages.
Murayama, Hideki, "Integrated Customer Supporting System View Workshop/CS, OA Business Personal Computer," NEC Business System, Denpa Press Co., Ltd., vol. 15, No. 12, Dec. 1997, 6 pages.
Nariani, Sushil, "Internet Telephony," Whatis.com, Oct. 25, 1999, 2 pages.
Newton'S Telecom Dictionary, The Official Dictionary of Telcommunications & the Internet, 16th Edition, Telecom Books, Feb. 2000, 3 pages.
Newton, Harry, "Newton's Telecom Dictionary," Flatiron Publishing, New York, 1994, 7 pages.
Orozco-Barbosa, Luis et al., "Design and Performance Evaluation of Intelligent Multimedia Services," Computer Communications, vol. 20, 1997, 14 pages.
Padmanabhan, M., et al. Speech Recognition Performance on a Voicemail Transcription Task, IBM T.J. Watson Research Center, Yorktown Height, NY, 4 pages.
Rangan, P. Venkat, et al., "A Window-Based Editor for Digital Video and Audio," Proceedings of the 25th Hawaii International Conference on System Sciences, IEEE, vol. 2, Jan. 1992, 9 pages.
Recker, Mimi M. et al., "Predicting Document Access in Large, Multimedia Repositories," ACM Transactions on Computer-Human Interaction, vol. 3, 1994, 23 pages.
Rodriguez-Martinez, Manuel et al., "MOCHA: A Self-Extensible Database Middleware System for Distributed Data Sources," International Conference on Management Data—SIGMOD, 2000, 12 pages.
Rosenberg, Arthur M., "Call Center Computer Telephony: Technology Overview," Gartner, Inc., Jan. 1998 (24 pages).
schmandt, Chris, "Phoneshell: The Telephone as Computer Terminal," Proceedings of ACM Multimedia Conference, 1993, 10 pages.
Sekine, Shoji et al., "Front Office Oriented Solution for Customer Satisfaction and Profit Expansion," Hitachi Hyoron Co, Ltd., Japan, vol. 80, No. 9, Sep. 1998, 11 pages.
Semilof, Margie, "Call Centers Go On-Line," Communications Week, No Date Available, 2 pages.
Sevcik, Peter et al., "The Call Center Revolution," Northeast Consulting Technical Paper, Jan. 1, 1997, 12 pages.
Smith, J.D., An Overview to Computer-Telecommunications Integration (CTI), Telecommunications, Conference Publication No. 404, IEEE, Mar. 26-29, 1995, 5 pages.
Sulkin, Allan, Building the ACD-LAN Connection, Business Communications Review, Jun. 1996, 4 pages.
Supplemental European Search Report for Application No. 98908545.1, dated Sep. 5, 2002, 4 pages.
Szlam, Aleksander et al., "Predictive Dialing Fundamentals," Flatiron Publishing, New York, 1996, 28 pages.
Tadamura, Katsumi et al., "Synchronizing Computer Graphics Animation and Audio," IEEE, 1998, 11 pages.

(56) References Cited

OTHER PUBLICATIONS

Taisei, Mori et al., "Call Center: Promotion of Information Use with a Direct Link to Core Business with Eye on the Internet Customer," Ric Telecom Corporation, Japan, vol. 10, No. 8, Aug. 1, 1998, 9 pages.

Tang, Jingrong et al., "Advanced Service Architecture for H.323 Internet Protocol Telephony," Computer Communications, vol. 23, 2000, 14 pages.

Thio, Fu Wang et al., "Distributed Multimedia Database: A Design and Application Study," the Fourth International Conference on High Performance Computing in the Asia-Pacific Region, IEEE, Beijing, China, vol. 2, May 2000, 6 pages.

Toji, Ryutaro et al., "A Study of Customer Contact Operation System and Functions," Proceedings of the IECE General Conference, Comm. 2, Mar. 6, 1997, 3 pages.

Toji, Ryutaro et al., "OCN Multimedia Customer Contact System," NTT Technical Journal, The Telecommunication Association, Japan, vol. 10, No. 1, Jan. 1, 1998, 6 pages.

Tsunemasa, Mizuo., "CTI World 2: World of CTI," Business Communication, vol. 34, No. 2, Feb. 1, 1997, 13 pages.

Van Zijl, Lynette, et al., "A Tool for Graphical Network Modeling and Analysis," IEEE Software, Jan. 1992, 8 pages.

Vazquez, E., et al., Graphical Interface for Communication Network Analysis and Simulation, Department of Telematic Engineering, Technical University of Madrid, IEE, 1991, Spain, 4 pages.

Wagner, Susanne., "Intralingual Speech-to-Text Conversion in Real-Time: Challenges and Opportunities," Challenges of Multidimensional Translation Conference Proceedings, 2005, 10 pages.

Wang, Yong et al., "Real-time scheduling for multi-agent call center automation", Information service agents lab, school of computing science Simon Fraser University, Burnaby,BC Canada, 1999, 13 pages.

Wolter, Roger., "XML Web Services Basics," Microsoft Corporation, Dec. 2001, 4 pages.

Zenel, Bruce et al., Intelligent Communication Filtering for Limited Bandwidth Environments, Computer Science Department, Columnia University, IEEE, 1995, 7 pages.

\* cited by examiner

SYSTEM AND METHODS FOR IMPROVING INTERACTION ROUTING PERFORMANCE

CROSS-REFERENCE TO RELATED APPLICATIONS

U.S. patent application Ser. No. 11/317,105, file on Dec. 22, 2005, is referenced in the original disclosure of this specification as a related application.

BACKGROUND OF THE INVENTION

1. Field of the Invention

The present invention is in the area of computer-telephony-integrated (CTI) telephone systems including Internet Protocol Network Telephony (IPNT) systems, and pertains particularly to a system and methods for improving the performance of complex interaction routing in a communication center.

2. Discussion of the State of the Art

Computer Telephony Integration (CTI) is well known and established in the art of telephony. Contact centers that employ state-of-art communications technologies practice interaction routing according to well developed software routines typically referred to as routing strategies.

Merging of pure telephone systems and computer networks has led to an evolution of transformation languages some of which are well known standards in the public domain and some of which are known to and are accessible to the inventor. Communication center extensible markup language (CCXML), and Voice Extensible Markup Language (VXML) are well known examples of languages used in expressing routing strategy that include expression of basic call control functions.

The inventor is aware of other XML-based languages used for expressing and executing interaction routing strategies in state-of-art communications centers (CC) where a typical CC application may include interactive voice response (IVR) scripts, intelligent routing strategies, various call control scenarios, agent scripting, statistical reporting, interaction workflow processing, agent level routing, customer profile-related routing, outbound call support, and multimedia interactions. XStrategy (XST) is known to the inventor and contains existing XML-based constructs but is enhanced through addition of newer constructs developed for more complex interaction routing environments.

An XML document enhanced with XST constructs has a file extension .sxml and may generally be defined as an (SXML) document. XST is used to specify call treatments, priorities, waiting time, timeouts and many other interaction states, variables, conditions, and commands. XST can be implemented as an extension of simple media control protocol (SMCP) known to the inventors for communicating call models represented in XML primitives or other low level descriptor languages.

XST can be used with a simple object application protocol (SOAP) or Xpath transport mechanisms in conjunction with back end data services as well as with Web service defined by Web Service Description Language (WSDL) or Web Service Flow Language (WSFL). It can be integrated into workflow management languages like Business Process Execution Language for Web Services (BPEL4WS) and XML Process Definition Language (XPDL). By tagging the existing scripts with an XST start tag, a predefined routine may be executed.

A tool known to the inventor as an interactive routing designer (IRD) is used to graphically construct XML-based routing strategies that are transformed into a more abstract interaction routing language (IRL) also known to the inventor. Extensible Style sheet Language Transformation (XSLT) may be used to transform XST directly to an abstract IRL or a valid subset of IRD XML. Exemplary XST sample scripts can be viewed in a U.S. patent specification entitled "Method for Implementing and Executing Communication Center Routing Strategies Represented in Extensible Markup Language" Ser. No. 11/317,105 Filed: Dec. 22, 2005.

Routing of customer interactions to customer service representatives is a critically important function of every state-of-art contact center. Traditional interaction routing is executed within a CC router in accordance with a routing logic expressed as an executable strategy. The flow of a routing strategy may be shaped or influenced by exiting states and rules relative to customer data, type of service, operational situation of contact center, business information, etc.

More complicated strategies contain sophisticated routines for accessing data from databases and manipulating or processing the accessed data. A byproduct of more complicated and intelligent routines is an increased difficulty in design and implementation of such routines. Deployment and actual runtime execution of these more complicated routing strategies also presents problems and challenges. For example, a typical intelligent routing strategy may occupy hundreds of pages represented in a complicated spaghetti-like graphical form. These routines are extremely error prone and face enormous qualification requirements from developers.

The IRD tool mentioned further above enables creation of sophisticated routing strategies aided by a graphics user interface (GUI) and a graphics regime. The IRD tool contains utilities for working with databases containing application and business data. However, the richness of language capability of the tool pales in comparison to traditional application programming languages like C, C++, C#, Java, etc. C#, or C-Sharp is a more recent C-based object oriented programming language developed by Microsoft™. The complexity of current state-of-art routing strategies subjects the host router to processes that substantially deviate from pure routing functions that the router is designed to perform. Execution of complex business calculations by the router often results in system overloads and resulting performance glitches.

Therefore what is needed in the art is a system and methods for improving the performance of interaction routing within a communication center.

SUMMARY OF THE INVENTION

The problem stated above is that sophisticated, intelligent routing strategies are desirable for routing interactions in a contact center, but many of the conventional regimens created for routing contact center interactions are difficult to design and execute and also create processing overloads or glitches in routing performance. The inventors therefore considered functional elements of a routing system looking for elements that exhibit complexity without creating processing problems that could potentially be harnessed to provide sophisticated intelligent routing but in a manner that would not contribute to programming errors, processing overloads, or glitches.

Every digital interaction routing system is driven by an application that includes a routing strategy one by-product of which is a constant hum of routing activity especially for a relatively large number of calls queued for service. Most such systems employ some interactive contact center application executed on a node having a processor and a router application running routing strategies for routing the calls.

The present inventors realized in an inventive moment that if, business-oriented logic and processing and pure routing logic and processing could be separated such that different dedicated processing resources and different design languages could be used to achieve a common goal of best fit determination of a destination resource for routing a particular event to, more sophisticated and intelligent overall strategies that are more efficiently executed and carried out might result.

The inventor therefore constructed a unique routing system for routing contact center events to available resources that allowed more complex and sophisticated tasks relative to business logic processing for destination matching or resource allocation and determination in routing to be performed on an application server and constrained the router application to executing and processing dynamic routing strategies created by the server that containing only pure routing logic. A significant improvement in the level of routing intelligence results with no impediment to processing efficiency at the router.

Accordingly, in one embodiment of the invention an interaction router is provided, comprising a computerized server executing a routing engine stored on a machine-readable medium, an interface at the server receiving information from an interaction switching element, the information regarding an interaction received at the switching element to be routed, an interface at the server to a wide area network (WAN), a function of the routing engine judging if one or more business-logic determinations are to be made to select a routing destination for the interaction, and a function for controlling the switch to route the interaction. If one or more business-logic determinations are to be made, the routing engine requests the business-logic determination from a remote server over the WAN, and upon receiving the determination from the remote server, uses the determination in controlling the switching element to route the interaction.

In one embodiment of the invention the business logic determination is requested through assertion of a universal resource locator (URL). Also in an embodiment more than one URL may be available for assertion, each URL pointing to a different portion of business logic at the remote server. Also in some embodiments the determination may be an executable strategy expressed in eXtensible markup language (XML). In this embodiment the XML strategy is parsed and executed at the interaction router.

In some embodiments the interaction switching element may be a computer telephony integrated (CTI) call switch. The WAN may be the Internet in many embodiments of the invention. The routing destination may be a live agent, a group of live agents or an automated treatment system.

In another aspect of the invention a method for routing an interaction received at an interaction switching element is provided, comprising the steps of (a) sending a request message to a remote server for a business logic determination; (b) at the remote server, processing any call data received against at least one rule to generate a business logic determination; (c) sending the business logic determination back to the interaction router; and (d) at the interaction router, parsing and executing the business logic determination to route the interaction.

In one embodiment of the method, in step (a), the remote server is an application server accessible by wide area network. Also in an embodiment the wide area network may be the Internet network. In some cases the business logic determination may be a machine readable and executable XML strategy. Also in an embodiment the request may sent as a result of the router invoking a URL during execution of a routing strategy. The XML strategy may be one of Xstrategy (XST), interactive routing designer (IRD) XML, or interaction routing language (IRL).

BRIEF DESCRIPTION OF THE DRAWING FIGURES

DETAILED DESCRIPTION

The inventors provide a system and methods for improving the performance of interaction routing within a communication center. The system utilizes an external application server resource to assist in more complex business logic processing leaving pure routing logic for processing by a dedicated event router. The system and methods of the invention are described in the following embodiments.

Figure 1:
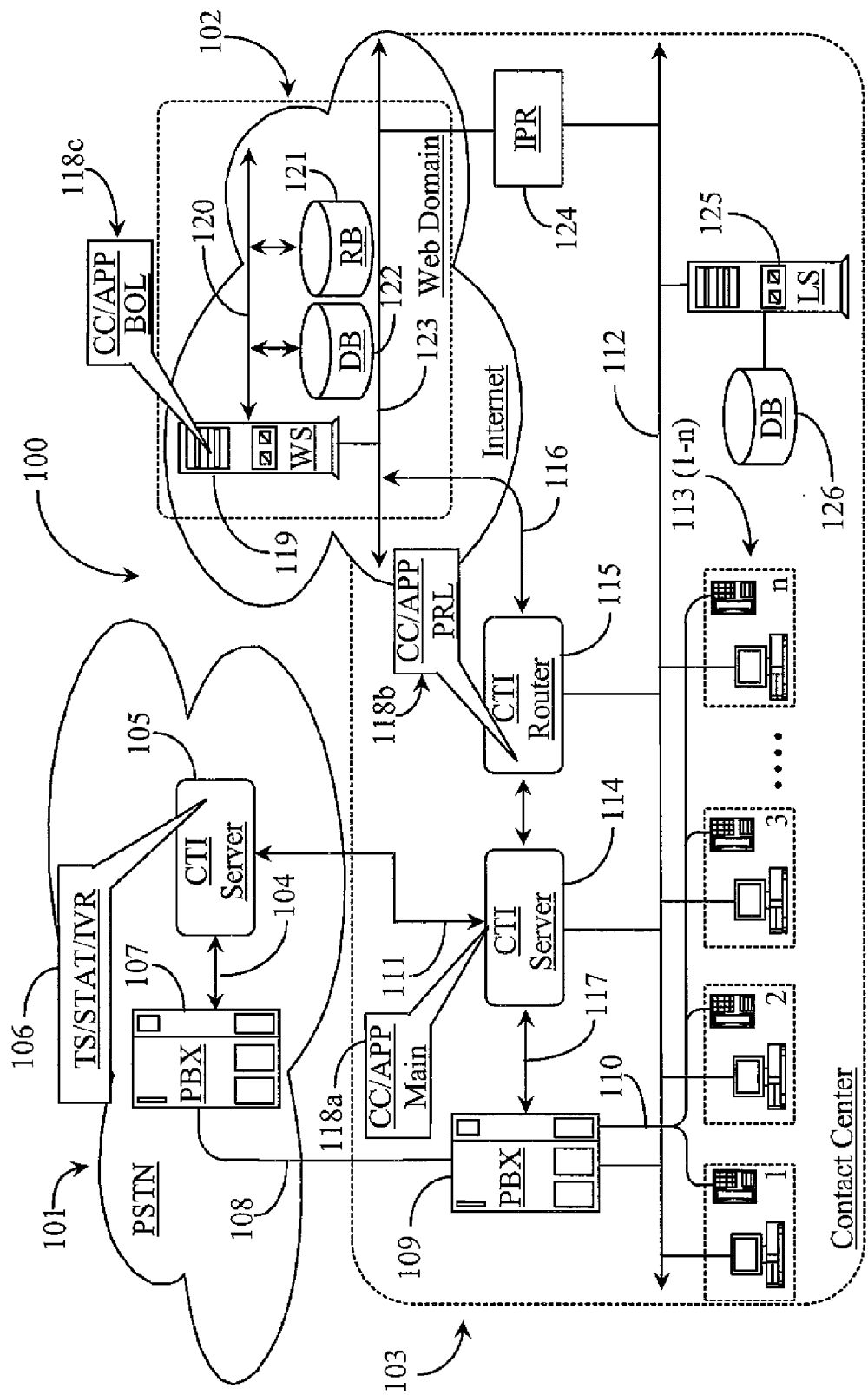
FIG. 1 is an architectural overview of a telecommunications network that supports integration of business and pure routing logic in event routing.

FIG. 1 is an architectural overview of a telecommunications network 100 that supports integration of business and pure routing logic in event routing. Telecommunications network 100 includes the well-known public switched telephony network (PSTN) 101, a wide area network (WAN) 102 labeled the Internet network in this example, and a contact center (CC) 103 also referred to in this specification as a communication center.

PSTN 101 is used in this example because of its high public access characteristic and geographic reach. Other telephone networks may also be represented without departing from the spirit and scope of the present invention such as private networks and wireless networks. A telephone switch 107 is illustrated within PSTN 101 at network level and is enhanced for computer telephony integration (CTI) by a CTI server 105 connected to the switch through a CTI link 104. Telephone switch 107 is a private branch exchange switch in this embodiment but may be some other switch type such as automatic call distributer (ACD) or some other telephone switching unit without departing from the spirit and scope of the invention.

CTI server 105 provides intelligent peripheral services 106 to switch 107 such as transaction services (TS), and interactive voice response (IVR) services. Intelligent routing may be performed at network level through CTI enhancement of switch 107 at the network level. PBX 107 is connected by a telephone trunk 108 to a central office telephone switch 109 within communication center 103. In this example, switch 109 is also a PBX switch. PBX 109 has connection to a local area network LAN 112 to which multiple agent computers belonging to agent stations 113 (1-n) are also connected.

PBX also has connection by way of internal telephone wiring 110 to a plurality of agent telephones provided at agent stations illustrated herein as agent stations 113 (1-n). Agents operating from stations 113 (1-n) may answer telephone calls incoming to PBX 109 using COST telephones or Internet protocol (IP) telephone applications resident on the respective agent computers. IP hand or headset telephones may also be provided and used for voice communications.

PBX 109, like PBX 107 in PSTN 101, is CTI enhanced by way of CTI server 114 connected to the switch within the call center by a CTI link 117. CTI server 105 in the PSTN and CTI server 114 within contact center 103 are connected by a separate data network 111. CTI server 114 is directly connected to LAN 112. One purpose for CTI networking is that data about incoming call events can be solicited at switch 107 in the network and can then be routed to agents ahead of actual telephone call events giving agents time to prepare for interactions. Other current data held within the contact center may also be accessed and presented for agents ahead of or at least at the time of a telephone call the current data looked up and presented according to some routing strategy that may have required business logic execution. CTI server 114 may run instances of TS/IVR 106 and other agent level routing (ALR) routines used within the center but not at network level.

A CTI router 115 is logically illustrated in this example and is connected to LAN 112. Router 115 may be a digital application running on a node such as a router application running on a computer, for example. CTI router 115 may be an application running on CTI server 114 instead of running on a separate machine. For purpose of discussion, router 115 is illustrated as a dedicated node connected to LAN 112 and to CTI server 114 by data link. Router 115 is responsible for executing routing strategy and determining routing destinations for all calls incoming at switch 109 and in some cases calls waiting at switch 107 through the CTI extension network.

A contact center application (CC/APP) is an application that automatically handles incoming events and allocates available contact center resources including live assistance to callers waiting in queue. In this example one or more CC/APPS are distributed to different processing resources within the center. In this example a main CC/APP 118a is illustrated on CTI server 114. CC/APP 118a includes the main portion of the application that interfaces with callers waiting in queue at switch 109 for example.

A CC/APP written for a state-of-art contact center typically includes intelligent routing strategies that may be selected and executed depending on some processing of data, business state, caller state, or other variables or conditions associated to rules within the center. In this example router 115 includes a CC/APP 118b that performs only pure routing of events within the center upon a request message or routing request message sent to it by CTI server 114 running CC/APP 118a and thus contains only pure routing logics (PRL).

In a preferred embodiment, router 115 has a network connection 116 to Internet network 102 exemplified herein by an Internet backbone 123. Internet 102 may be a private Internet segment or VPN maintained by the contact center for the purpose of provision of robust business processing and transaction capabilities over high-speed network. To this effect, an application/Web server 119 is provided on Internet network backbone 123 and is adapted to run CC applications over Hypertext Transfer Protocol (HTTP). Server 119 includes CC/APP (BOL) 118c which contains business oriented logic and task definitions for processing CC data to result and then determining routing strategy according to result.

APP server 119 is connected to a data network 120 which supports a rules base (RB) 121 and a data storage facility or database (DB) 122. DB 122 may contain business data, customer data, payment information, or other business-type information and remains accessible to server 119. APP server 119 is adapted to execute business oriented logic as a part of CC/APP 1183. It is important to note herein that while CC/APP 118a and CC/APP 118b are designed with the same tool such as the Interactive Route Designer (IRD) tool, CC/APP 118c is designed using a more sophisticated and time tested server application programming language like C/C++, C#.

Router 115 is Internet protocol (IP) enabled and can issue an HTTP GET or POST to server 119, which may then execute its own portion of the CC/APP BOL 118b corresponding to the requests sent by the router. Server 119 in includes a language generator (not illustrated) and a suitable vocabulary in XML constructs to enable the server to dynamically generate executable routing strategies based on computing that has been performed at the server.

In general when a call arrives at switch 109, CTI server 114 executes an instance of main CC/APP to interact with the caller. When the executed CC/APP (main portion) 118a comes to a place in the process where a routing determination is to be made then it passes a route request to dedicated router 115. Router 115 executes and runs a portion of the CC/APP (118b) that deals only with pure routing logic (PRL). Pure routing logic does not contain any complex processing of data or complex access or rule-based manipulation of data residing in databases. It only contains the strategies for routing the event to a destination. In some cases that is an automated system or a live agent and a more complex treatment is not required to accomplish successful routing of the event.

While CTI router 115 is running a pure routing logic portion of the CC/APP, it may occur in the PRL strategy a point defining a need for further more complex processing to better determine a final destination for an event or, in this case, a call. At such a point in the process, router 115 may send an HTTP request to APP server 119 to start CC/APP 118c and to perform some defined routine or a sequence of tasks that may require lookups of data from DB 122, consultation in RB 121 and processing of accessed data to determine outcome or results. The associated business processing portion of the overall routing strategy is given a universal resource locator (URL) at application (Web) server 119. The correct URL is embedded in the strategy executed in the router and invocation of the URL causes the HTTP channel to open between the router and the Web server.

Server 119 is adapted according to pre-defined business process workflow and definition to obtain enough information relative to current call campaign rules and stated need to generate, "on the fly", an intelligent routing strategy formed as an XML-based executable instruction that may be generated in an XML-based markup and may be sent back to router 115. The executable instruction also termed a strategy by the inventors plugs into the CC/APP 118b running on the router and is parsed and executed immediately upon receipt, also "on the fly".

In a preferred embodiment CC/APP 118c residing on server 119 is constructed using a standard programming application language like C/C++, C#, Java. In this way the processes for complex execution and manipulation of data according to predefined business logics are performed on a different processing system than the one dedicated to event routing. The CC/APP is created for different processing environments, that is to say, a caller interaction and event routing environment and a business process environment.

Application server 119 is adapted as described further above to generate an XML-based routing strategy that includes the identification of the final destination agent, agent group, etc. that will handle the interaction. The router receives this strategy and immediately parses and executes the strategy in real time while the caller is waiting in queue. In one embodiment there may be more than one HTTP request sent from router 115 to server 119 and HTTP responses containing pure routing strategies from the server back to the router per event in queue. Workflow including multiple routing strategies may be integrated into the CC application process as long as the workflow has to do with routing and not unfamiliar data processing that would tax the router processor beyond something reasonable.

CC 103 includes an Internet protocol router (IPR) 124 connected to LAN 112 on one side and to Internet backbone 123 on the network side. IPR may server as a gateway for multimedia communications arriving into the center and being sent out from the center. CTI router 115 also has a network side connection to Internet backbone 123 and a center-side connection to LAN 112 and could also server as a digital router for routing email, messaging and other like events. In this example, CC hosted data and rules are contained in DB 122 and in RB 121 within the Internet cloud directly networked to sever 119. However, a local server (LS) 125 may be provided and connected to LAN 112 and a DB 126 may be connected directly to the server. In one embodiment server 119 may have permission to access LS 125 and data stored in DB 126. Business data, customer data, rules, and other critical data may be stored locally at the center but made accessible to the Web-based application server.

In one embodiment the system of the invention is enabled by an online third party provider that provides the added processing power of an application server and language generator to create and deliver executable routing strategies that result in much more efficiency in interaction routing at the contact center side. Critical business data required to create the strategies may be stored locally and mirrored to the service network (online) for faster access. The third party application server may also access data locally without departing from the spirit and scope of the present invention.

After CTI router 115 receives and executes a routing strategy it may send the routing path used to CTI server 114, which may in turn send the path to CTI server 105 if the call event is to be routed from the point of PBX 107 instead of PBX 109.

Figure 2:
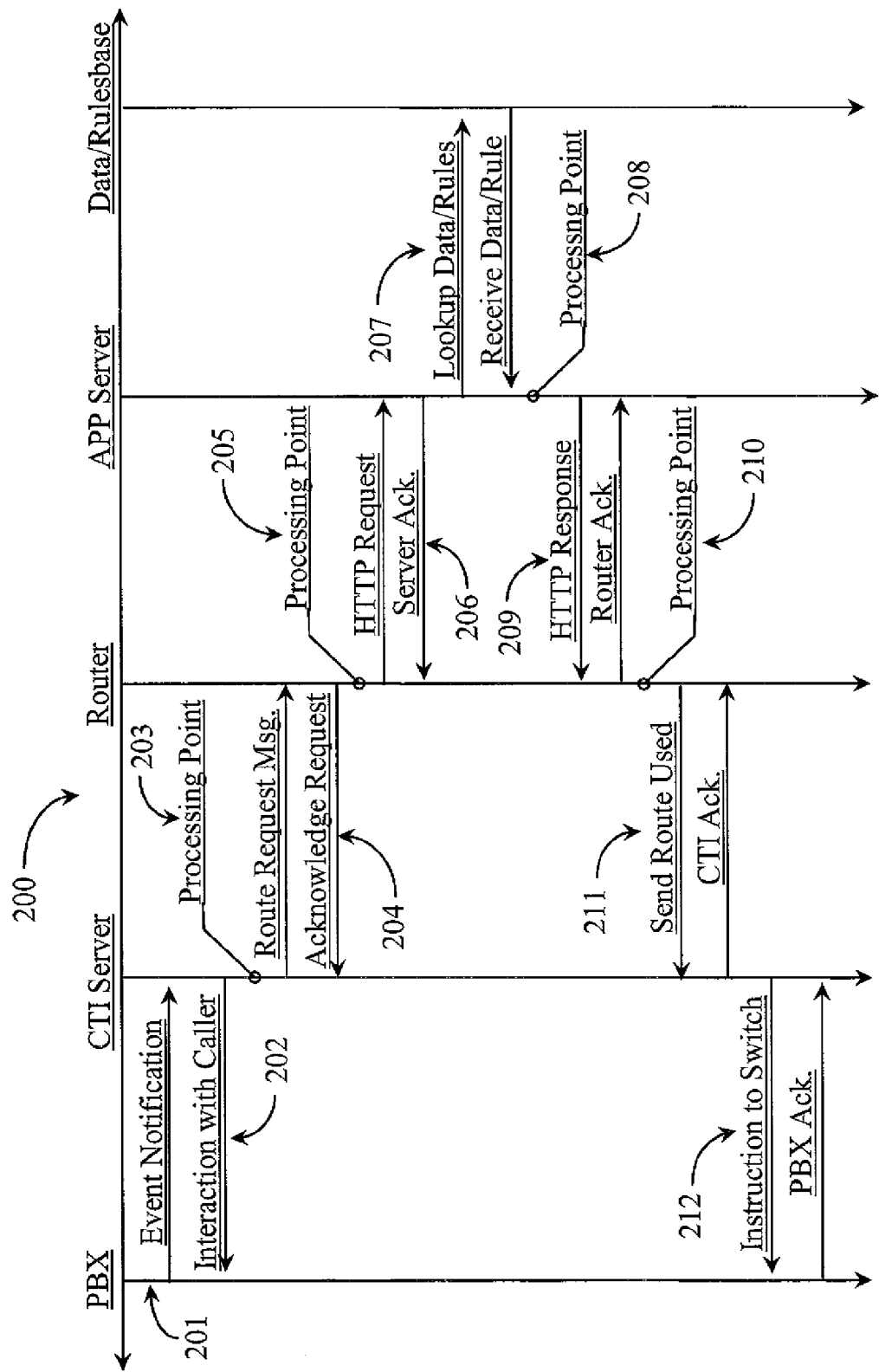
FIG. 2 is an interaction flow chart illustrating interaction between nodes in event routing according to an embodiment of the present invention.

FIG. 2 is an interaction flow chart 200 illustrating interaction between nodes in event routing according to an embodiment of the present invention. Chart 200 is descriptive of a routing system including a PBX, CTI Server, a Router, an Application server, and a data base/rules base.

At step 201 an incoming event notification is sent from a PBX to a CTI-Server. The CTI-server executes a CC application and an interaction with the caller 202 ensues such as an IVR treatment for example. A processing point 203 comes up at the CTI server in the executed application at which some type of routing is required beyond what the CTI server can do. The CTI server sends a route request message to the router and the router acknowledges the request at step 204.

The router then executes the routing strategy according to the request until a processing point 205 is reached in the application at which point additional information is required in order to determine a best destination for routing the event. At step 206 the router sends an HTTP request associated with universal resource locator (URL) to an application server and receives an acknowledgement of the sent request back. URLs are used to specify the portions of the business logic available to the application server that should be executed. Wherever the routing strategy requires processing of business oriented data a URL will be embedded that links the process to the appropriate business logic at the application sever on the Web.

The application server looks up data and/or rules from a database/rules base and receives data and/or rules for processing at step 207. The application server processes data against one or more rules until it has some result. The application server also generates dynamic executable routing strategy that contains only pure routing constructs at a processing point 208. The application server sends the strategy in the form of an XML document to the router in an HTTP server response and the server receives an acknowledgement from the router at step 209.

At processing point 210, the router executes and runs the routing strategy including allocating the required resources for handling the event. At step 211 the router sends the route used back to the CTI server and the CTI server acknowledges receipt of the route information. The CTI server sends instruction to the switch or queue to the PBX to route the event and the PBX acknowledges the instruction at step 212. In this example all processing that is not dedicated to pure interaction routing is performed by the application server at processing point 208. All of the business side processing and routing strategy generation that results is transparent to the call center side. The resulting routing strategies are plugged into the CC application at the router and are immediately executed. The overall result is that more complex and flexible interaction routing may occur in a manner that does not overload the routing system. Moreover, the router no longer has to check availability of resources for routing as that is performed by the application server as well.

Figure 3:
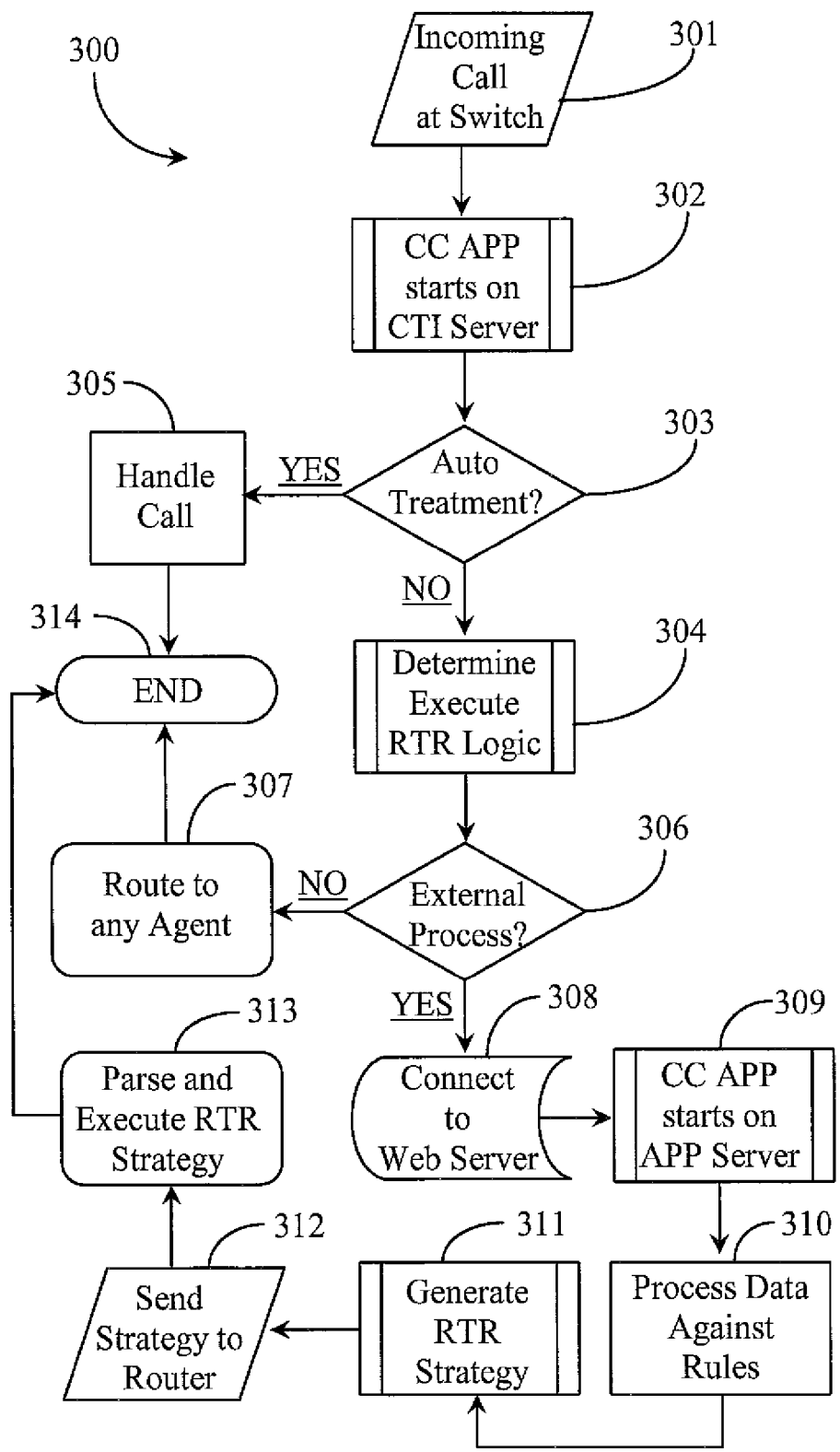
FIG. 3 is a process flow chart illustrating steps for routing an incoming event according to an embodiment of the present invention.

FIG. 3 is a process flow chart illustrating steps 300 for routing an incoming event according to an embodiment of the present invention. At step 301 a call arrives at a PBX or other type of call center switch and notification of the event is passed to a CTI server. An instance of contact center application starts on the connected CTI server to begin interaction with the caller. Such interaction may include IVR treatment, contact center voice applications, etc.

At step 303 the contact center application determines if the call event can be disposed of via an automated treatment or not. If at step 303 an automated treatment can be used to dispose of the call then at step 305 the treatment is used to handle the call. This step may involve routing the call to the automated treatment node if the caller is not already engaged by the automated treatment node. An automated treatment may be any interactive process that does not require a live operator. After the treatment is administered at step 305 the process for that event may be terminated at step 314. In this case no special business logic or processing was used in routing. It is possible in this path that a routing request message was not necessary so that the interaction router was not even involved with that specific event.

If the contact center application determines that the call event cannot be disposed of via an automated treatment, at step 304 the contact center application may request a routing strategy by passing a route request message to an interaction router. The router may then select and execute a routing strategy that contains only pure routing logic as an extended part of contact center application runtime. A distributive processing environment may exist where the router is actually supported by a processor separate from the processor supporting the CTI server. In one embodiment the router and CTI server are supported by the same processor.

Determination that an automated treatment cannot be used to handle the event could be determined by information provided to the application by the caller prior to that point in the process or other call data made available at the time. Depending on the nature of services and other possible factors, the contact center application running on the router in execution of a routing strategy may arrive at a point in the process where some external processing is required to determine a best treatment for the call. The contact center application portion running on the router may make this determination based on available call data at step 306.

If at step 306 the application determines that no external processing is required to successfully route the call event then the router may route the event to any available contact center agent at step 307. In this event only pure routing logic was executed and a simple route to an available agent is determined based on available call data. No complicated business data processing or rules consultation is performed and therefore, no third-party processing service is required. After the router connects the call to an available agent in step 307 the process may terminate for that event at step 314.

If at step 306 it is determined that external processing is required in order to route the call event, at step 308 the router connects to a Web-based application server by invoking a URL embedded in the pure routing logic being executed at the router. To be clear, an existing routine executed at the router determines based on available call data or information solicited during interaction leading up to that point in the process that the event requires external processing. The URL then is a link between the point of process where this determination is made and the business logic portion of the distributed CC application that will be executed to fulfill the request.

In one embodiment the router request is an HTTP GET or POST message. At step 309 the CC application running at the Web-based application server executes the business logic targeted by URL in the request. The logic may include tasks for accessing databases, manipulating customer and business data, consulting business rules and so on. This business oriented logic can be created using any programming tools and languages available to the application server programmer. At step 310 the application server executing the target business logic accesses and processes the required data against predefined business rules to render some expected result. The logic may vary widely as may the exact processing sequence.

At step 311 the application server may generate a routing strategy using a markup language generator that renders the executable strategy in some form of extensible markup language. In one embodiment the form is interaction routing language (IRL). Other forms such as XStrategy (XST) or interactive routing designer (IRD) XML may also be used. The generated routing strategy is sent in a server HTTP response to the router at step 312. The strategy plugs into the appropriate place in the interactive process and is immediately parsed and executed by the router as pure routing logic at step 313. The process for that event may be terminated at step 314 after the resources for handling the event are allocated for the interaction. Of course the route is passed on to the CTI server which routes the interaction to the appropriate resource, which in this example is a live agent.

One with skill in the art of telephony routing will appreciate that rules for routing and data relied upon to help determine need may vary widely. Skill-based routing, statistical-based routing, predictive routing, historical-based routing, priority-based routing, trust-based routing and other intelligent routing techniques may be observed where external processing is required to make the correct or "best-fit" determination of a final destination for a particular call event. Moreover, the process is not limited to telephone interaction as a variant of this process may be applied to Web services and other electronic interaction media such as text messaging, interactive chat, and so on. In one embodiment XML-based routing strategies may be pre-defined strategies created on the Web. These strategies may be pushed into a routing application at a contact center to execute the strategy as a Web-based service.

One key benefit of the system of the invention is that the router may be dedicated to executing pure routing logic and therefore is improved in efficiency due to a lack of any requirement for processing any business or customer data or accessing any databases or rules bases. Another benefit to the system is that intelligent routing strategies can be generated (APP server) and executed (Router) on the fly by cooperating systems. Therefore dynamic flexibility exists for working with all kinds of conditions that may exist at the time of interactions. Routing logic can be made more sophisticated through design of the business portion of routing logic or business oriented logic (BOL) to execute on an application server. Development of the business portion of routing is not limited to router capability constraints. Performance level of the router will be increased IS by dedication the router to pure routing logic, which includes path and agent allocation.

It will be apparent to one with skill in the art that the distributive routing system of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. An interaction router, comprising:
   a first interface for receiving information from an interaction switching element, the information regarding an interaction received at the switching element to be routed;
   second interface coupled to a wide area network (WAN); and
   a machine-readable medium storing instructions configured to be executed by a processor, the instructions including:
      receiving via the first interface a request for routing the interaction;
      executing a routing strategy in response to the request, the routing strategy including a link to a business process hosted by a remote server coupled to the interaction router over the wide area network;
      transmitting, in response to the link in the routing strategy, a request to the remote server over the second interface for executing the business process associated with the link, wherein in executing the business process, the remote server is configured to perform a lookup of one or more business rules from a first database and retrieve data from a second database, and process the retrieved data against the one or more business rules for dynamically generating one or more executable routing instructions;
      receiving the executable routing instructions from the remote server over the wide area network; and
      executing the executable instructions as part of the routing strategy for routing the interaction to a routing destination.

2. The interaction router of claim 1 wherein the link is a universal resource locator (URL).

3. The interaction router of claim 1 wherein the URL points to one of different portions of business logic at the remote server.

4. The interaction router of claim 1 wherein the executable routing instructions are expressed in an extensible markup language (XML).

5. The interaction router of claim 4 wherein the instructions for executing the executable instructions further include instructions for parsing the XML instructions.

6. The router of claim 1, wherein the business process is defined via a first programming language different from a language defining the executable instructions.

7. The router of claim 6, wherein the executable instructions are expressed in an extensible markup language.

8. The router of claim 1, wherein the routing instructions are generated dynamically in response to the processing of the data against the one or more business rules.

9. The router of claim 1, wherein the business process relates to a current call campaign for a customer contact center.

10. The router of claim 1, wherein the request to the remote server is transmitted through an internet protocol.

11. The router of claim 1, wherein the remote server comprises a Web-based application server.

12. The router of claim 1, wherein the data comprises at least one of business data, customer data, or payment information.

13. The router of claim 1, wherein the business process includes tasks for manipulating at least one of customer data or business data.

14. A method for routing an interaction received at an interaction switching element comprising:
- receiving by a routing device a request for routing the interaction;
- executing by the routing device a routing strategy in response to the request, the routing strategy including a link to a business process hosted by a remote server coupled to the routing device over a wide area network;
- transmitting by the routing device, in response to the link in the routing strategy, a request to the remote server for executing the business process associated with the link, wherein in executing the business process, the remote server is configured to perform a lookup of one or more business rules from a first database and retrieve data from a second database, and process the retrieved data against the one or more business rules for dynamically generating one or more executable routing instructions;
- receiving by the routing device the executable routing instructions from the remote server over the wide area network; and
- executing by the routing device the executable instructions as part of the routing strategy for routing the interaction to a routing destination.

15. The method of claim 14 wherein the wide area network is the Internet network.

16. The method of claim 14 executed according to interactive voice response result.

17. The method of claim 14, wherein the business process is defined via a first programming language different from a language defining the executable instructions.

18. The method of claim 17, wherein the executable instructions are expressed in an extensible markup language.

\* \* \* \* \*